(12) United States Patent
Choi et al.

(10) Patent No.: US 9,955,068 B2
(45) Date of Patent: Apr. 24, 2018

(54) APPARATUS AND METHOD FOR OPERATING A COMPOSITION OF A PICTURE IN A PORTABLE TERMINAL

(71) Applicant: Samsung Electronics Co., Ltd., Suwon-si, Gyeonggi-do (KR)

(72) Inventors: Yong Ha Choi, Suwon-si (KR); Alexander Larionov, Suwon-si (KR); Jae Ki You, Suwon-si (KR); Soon Hyun Cha, Anyang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 44 days.

(21) Appl. No.: 14/324,613

(22) Filed: Jul. 7, 2014

(65) Prior Publication Data

US 2015/0015730 A1    Jan. 15, 2015

(30) Foreign Application Priority Data

Jul. 15, 2013  (KR) .................. 10-2013-0082864
May 19, 2014  (KR) .................. 10-2014-0059527

(51) Int. Cl.
*H04N 5/232*  (2006.01)
*H04N 1/00*   (2006.01)

(52) U.S. Cl.
CPC ..... *H04N 5/23222* (2013.01); *H04N 1/00183* (2013.01); *H04N 5/23203* (2013.01); *H04N 5/23216* (2013.01); *H04N 5/23293* (2013.01); *H04N 2201/0031* (2013.01); *H04N 2201/0032* (2013.01)

(58) Field of Classification Search
None
See application file for complete search history.

(56) References Cited

U.S. PATENT DOCUMENTS

| 2006/0064472 | A1  | 3/2006 | Mirho |
| 2011/0228044 | A1* | 9/2011 | Miyamoto ......... H04N 5/23222 348/36 |
| 2011/0234817 | A1  | 9/2011 | Sakamoto |
| 2012/0040719 | A1* | 2/2012 | Lee ................ G06F 1/1626 455/557 |
| 2013/0038759 | A1* | 2/2013 | Jo ................. H04N 5/2256 348/240.99 |
| 2013/0182138 | A1* | 7/2013 | Cho ............... G06F 9/4445 348/211.3 |
| 2014/0218549 | A1* | 8/2014 | Sheaffer ........... H04N 5/23203 348/207.11 |

FOREIGN PATENT DOCUMENTS

| KR | 10-2005-0095485 A  | 9/2005 |
| KR | 10-2008-0073896 A  | 8/2008 |
| KR | 10-2012-0014794 A  | 2/2012 |
| KR | 10-2012-0074493 A  | 7/2012 |
| KR | 20-2012-0008216 U  | 11/2012 |

* cited by examiner

*Primary Examiner* — Justin P Misleh
(74) *Attorney, Agent, or Firm* — Jefferson IP Law, LLP

(57) ABSTRACT

A method and an electronic device are provided. An electronic device wirelessly connects to another electronic device including a camera unit, receives image data from the other electronic device, displays an image using the image data, receives a user input for changing a photographic composition, and transmits, to the other electronic device, a control signal formed based on the user input.

9 Claims, 23 Drawing Sheets

APPARATUS AND METHOD FOR OPERATING A COMPOSITION OF A PICTURE IN A PORTABLE TERMINAL

CROSS-REFERENCE TO RELATED APPLICATION(S)

This application claims the benefit under 35 U.S.C. § 119(a) of a Korean patent application filed on Jul. 15, 2013 in the Korean Intellectual Property Office and assigned Serial number 10-2013-0082864 and a Korean patent application filed on May 19, 2014 in the Korean Intellectual Property Office and assigned Serial number 10-2014-0059527, the entire disclosure of each of which is hereby incorporated by reference.

TECHNICAL FIELD

The present disclosure relates to an electronic device. More particularly, the present disclosure relates to a method and apparatus for controlling a composition of a picture in an electronic device.

BACKGROUND

Electronic devices, such as a smart phone, a tablet, and the like, provide various useful functions to users through varied applications. Therefore, the electronic devices have developed as devices that provide varied types of information in addition to a voice call function, through providing various functions. In particular, the electronic device is equipped with a camera, and provides a function of capturing an image using the camera.

When the electronic device that provides an image capturing function captures an image using a camera, a photographic composition of an image is determined based on the intention of a user (i.e., a capturer of the image) of the electronic device.

As described above, a photographic composition of an image is determined by a capturer of the image and thus, a subject that is captured is aware of a composition of its image after the image is captured.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and an apparatus that enable an electronic device of a subject to be captured to transmit photographic composition information to an electronic device of a capturer of an image, so that the image is captured at a composition desired by the subject when the image is captured.

Another aspect of the present disclosure is to provide a method and an apparatus that output a composition desired by a subject to be captured using photographic composition information through an alarm so that an image is captured at the composition desired by the subject.

Another aspect of the present disclosure is to provide a method and an apparatus for obtaining an image for a composition or an area that an image acquisition controlling device uses during image capturing.

In accordance with an aspect of the present disclosure, a method in an electronic device is provided. The method includes wirelessly connecting, by the electronic device, to another electronic device including a camera unit, receiving, by the electronic device, image data from the other electronic device, displaying, by the electronic device, an image using the image data, receiving, by the electronic device, a user input for changing a photographic composition, and transmitting, by the electronic device, to the other electronic device a control signal formed based on the user input.

In accordance with another aspect of the present disclosure, a method in an electronic device is provided. The method includes wirelessly connecting, by the electronic device including a camera unit, to another electronic device including a display unit, generating, by the electronic device, an image, transmitting, by the electronic device, to the other electronic device, image data generated from the image, and receiving, by the electronic device, a control signal from the other electronic device, wherein the control signal indicates changing at least one of an angle, a location, and a direction of the image.

In accordance with another aspect of the present disclosure, an electronic device is provided. The electronic device includes a connecting unit configured to wirelessly connect to another electronic device including a camera unit, and a controller configured to control to receive image data from the other electronic device, to display an image using the image data, to receive a user input for changing a photographic composition, and to transmit a control signal formed based on the user input to the other electronic device.

In accordance with another aspect of the present disclosure, an electronic device is provided. The electronic device includes a connecting unit configured to wirelessly connect to another electronic device including a display unit, and a controller configured to control to generate an image using a camera unit, to transmit image data generated from the image to the other electronic device, and to receive a control signal from the other electronic device, wherein the control signal indicates changing an angle, a location, and a direction of the image.

In accordance with another aspect of the present disclosure, an electronic device is provided. The electronic device includes a communication interface configured to receive a reference image and a data processing module configured to control to display a change guide corresponding to a capturing composition change relating to the reference image in correspondence to an event occurrence.

In accordance with another aspect of the present disclosure, an electronic device is provided. The electronic device includes a camera module configured to collect a reference image, a communication interface configured to transmit the reference image, and a data processing module configured to control to receive guide change information guiding a capturing composition change relating to the reference image and to display a change guide corresponding to the guide change information.

In accordance with another aspect of the present disclosure, a non-transitory computer-readable storage media storing at least one instruction executed by at least one processor, wherein the at least one instruction performs an operation of receiving guide change information guiding a capturing composition change relating to a transmitted reference image and an operation of displaying a change guide corresponding to the guide change information is provided.

In accordance with another aspect of the present disclosure, a non-transitory computer-readable storage media storing at least one instruction executed by at least one processor, wherein the at least one instruction includes an operation of receiving a reference image, and an operation of displaying a change guide corresponding to a guide change relating to the reference image in correspondence to an event occurrence is provided.

According to the present disclosure, an electronic device of a subject to be captured transmits photographic composition information to an electronic device of a capturer of an image so that the image is captured at a composition desired by the subject.

According to the present disclosure, a composition desired by a subject to be captured is output using photographic composition information through an alarm so that the image is captured at the composition desired by the subject.

According to the present disclosure, an image fit for a user's intention to check the image is obtainable remotely during image capturing, so that various remote service managements are supported.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

The same reference numerals are used to represent the same elements throughout the drawings.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

A terminal according to an embodiment of the present disclosure includes a portable terminal and an electronic device that has difficulty in movement. Here, the electronic device that has difficulty in movement includes a personal computer and the like. The portable terminal is an electronic device that is readily portable and mobile, which corresponds to a video phone, a portable phone, a smart phone, an International Mobile Telecommunication 2000 (IMT-2000) terminal, a Wideband Code Division Multiple Access (WCDMA) terminal, a Universal Mobile Telecommunication Service (UMTS) terminal, a Personal Digital Assistant (PDA), a Portable Multimedia Player (PMP), a Digital Multimedia Broadcasting (DMB) terminal, an Electronic (E)-Book, a portable computer, such as a notebook, a tablet and the like, a digital camera, or the like.

Figure 1:
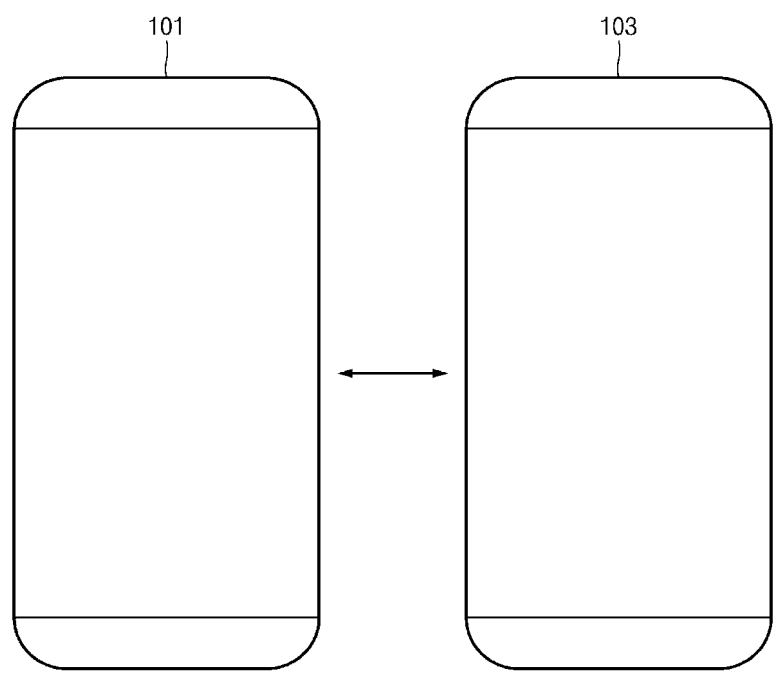
FIG. 1 is a diagram illustrating a communication system according to an embodiment of the present disclosure.

FIG. 1 is a diagram illustrating a communication system according to an embodiment of the present disclosure.

Referring to FIG. 1, the communication system includes a first portable terminal 101 and a second portable terminal 103.

Each component element will be described as follows. The first portable terminal 101 generates a first image in response to a request from a user, stores the generated first image, and determines whether transmission of the first image is requested. In this example, when execution of a predetermined function is requested by the user after the first image is displayed, the first portable terminal 101 determines that transmission of the first image is requested. Also, when the first image is selected after the predetermined function is executed by the user, the first portable terminal 101 determines that transmission of the first image is requested.

Here, the predetermined function includes an air view function or a mirror image function. The air view function or the mirror image function indicates a function that transmits, to the second portable terminal 103, an image that is provided or capable of being provided in the first portable terminal 101 so that the second portable terminal 103 displays the transmitted image.

When transmission of the first image is requested, the first portable terminal 101 detects the first image from among at least one image stored in advance, and transmits the detected first image to the second portable terminal 103. In this example, the first portable terminal 101 transmits the first image through a short-distance wireless communication scheme, or the third or fourth generation mobile communication scheme. Here, the short-distance wireless communication scheme includes Bluetooth or WiFi and the like, and the third or fourth generation mobile communication scheme includes $3^{rd}$ Generation Partnership Project (3GPP) or Long Term Evolution (LTE).

The first portable terminal 101 receives photographic composition information from the second portable terminal 103, determines a photographic composition of the first portable terminal 101 based on the received photographic composition information, and outputs a result of the determination. Here, the photographic composition information includes information for changing the photographic composition of the first portable terminal 101, and is classified into first photographic composition information that includes a reference sensor change value indicating a change value associated with a movement of the second portable terminal 103 and second photographic composition information that includes a reference image change value indicating a change value between images captured in the second portable terminal 103.

In this example, when the first portable terminal 101 receives the first photographic composition information, the first portable terminal 101 determines a photographic composition of the first portable terminal 101 based on the reference sensor change value included in the first photographic composition information. When the first portable terminal 101 receives the second photographic composition information, the first portable terminal 101 determines the photographic composition of the first portable terminal 101 based on the reference image change value included in the second photographic composition information.

When information associated with the photographic composition of the first portable terminal 101 is identical to the photographic composition information received from the second portable terminal 103, the first portable terminal 101 outputs a first alarm to recommend capturing an image. Conversely, when the information associated with the photographic composition of the first portable terminal 101 is different from the photographic composition information received from the second portable terminal 103, the first portable terminal 101 outputs a second alarm including an image, a sound, a vibration and the like for changing a photographic composition.

When capturing a second image is requested, the first portable terminal 101 generates the second image, and stores the generated second image.

The second portable terminal 103 determines whether the first image is received from the first portable terminal 101. When the first image is received, the second portable terminal 103 stores the received first image and displays the stored first image. The second portable terminal 103 determines whether changing a photographic composition is requested by a user. Here, the request for changing the photographic composition is requested for changing a photographic composition for a second image to be captured in the first portable terminal 101 after the first image.

When changing the photographic composition is requested, the second portable terminal 103 generates photographic composition information of the second image, and transmits the generated photographic composition information to the first portable terminal 101.

Figure 2:
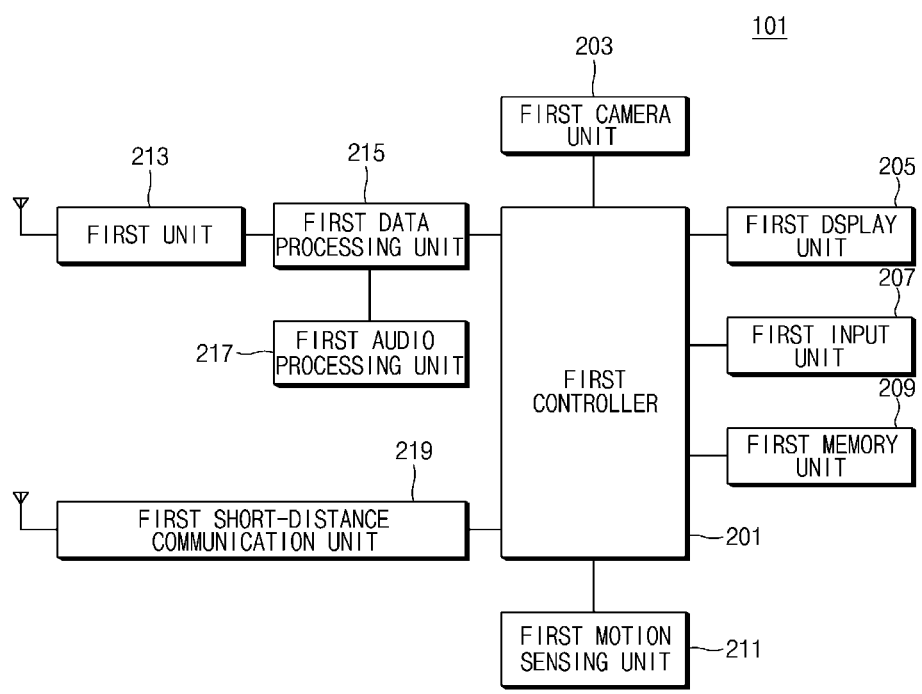
FIG. 2 is a block diagram illustrating a first portable terminal according to an embodiment of the present disclosure.

FIG. 2 is a block diagram illustrating the first portable terminal 101 according to an embodiment of the present disclosure.

Referring to FIG. 2, the first portable terminal 101 includes a first controller 201, a first camera unit 203, a first display unit 205, a first input unit 207, a first memory unit 209, a first motion sensing unit 211, a first Radio Frequency (RF) unit 213, a first data processing unit 215, a first audio processing unit 217, and a first short-distance communication unit 219.

Each component element will be described as follows. The first RF unit 213 performs a wireless communication function of a portable terminal. In particular, the first RF unit 213 includes a wireless transmitter to up-convert and amplify a frequency of a transmitted signal, a wireless receiver to low noise amplify and down-convert a received signal, and the like. The first data processing unit 215 includes a transmitter that encodes and modulates a transmitted signal, a receiver that demodulates and decodes a received signal, and the like. Here, the first data processing unit 215 is formed of a modem and a codec, and the codec includes a data codec that processes packet data and the like, and an audio codec that processes an audio signal such as a voice and the like.

The audio processing unit 217 plays back, through a speaker, a received audio signal output from the first data processing unit 215, and transmits an audio signal, which is generated from a microphone, to the first data processing unit 215. The first input unit 207 includes keys used for inputting number and character information and function keys used for setting various functions. The first display unit 205 displays an image signal in a screen, and displays data of which output is requested by the first controller 201. When the first display unit 205 is embodied as a touch display screen scheme, for example, a capacitive scheme, a resistive scheme, or the like, the first input unit 207 may include a minimum number of predetermined keys, and the first display unit 205 may be substituted for a part of a key input function of the first input unit 207.

The first memory unit 209 includes a program memory and a data memory. Here, the program memory stores a booting and operating system for controlling general operations of a portable terminal, and the data memory stores various data generated while a portable terminal operates. The first short-distance communication unit 219 performs short-distance communication with the second portable terminal 103 based on a control of the first controller 201. For example, the short-distance communication may be WiFi or Bluetooth.

The first camera unit 203 captures an image of a subject and generates an image, and outputs the generated image to the first controller 201. The first motion sensing unit 211 senses a motion of the first portable terminal 101, and outputs the sensed result to the first controller 201. For example, the first motion sensing unit 211 includes a geomagnetic field sensor and an acceleration sensor. The first motion sensing unit 211 generates at least one of a travel direction sensor value, a travel distance sensor value, and an angle sensor value of the first portable terminal 101 using the geomagnetic field sensor and the acceleration sensor, and outputs at least one of the generated travel direction sensor value, the travel distance sensor value, and the angle sensor value to the first controller 201.

The first controller 201 controls general operations of a portable terminal. For example, the first controller 201 generates the first image using the first camera unit 203, stores the generated first image in the first memory 209, and determines whether transmission of the first image is requested. According to an embodiment of the present disclosure, the first image may be an image generated in a preview mode of the first camera 203. The preview mode is a mode that displays an image that is expected to be captured before an image is captured.

In this example, when execution of a predetermined function is requested by a user after the first image is displayed, the first controller 201 determines that transmission of the first image is requested. Also, when the first image is selected after the predetermined function is executed by a user, the first controller 201 determines that transmission of the first image is requested. Here, the predetermined function includes an air view function or a mirror image function. The air view function or the mirror image function indicates a function that transmits, to the second portable terminal 103, an image that is provided or capable of being provided in the first portable terminal 101 so that the second portable terminal 103 displays the transmitted image.

When transmission of the first image is requested, the first controller 201 detects the first image from among at least one image stored in advance in the first memory unit 209, and transmits the detected first image to the second portable terminal 103. In this example, the first controller 201 transmits the first image through a short-distance wireless communication scheme, or the third or fourth generation mobile communication scheme. Here, the short-distance wireless communication scheme includes Bluetooth, WiFi, or the like, and the third or fourth generation mobile communication scheme includes 3GPP or LTE.

The first controller 201 receives photographic composition information from the second portable terminal 103, and determines a photographic composition of the first portable terminal 101 based on the received photographic composition information, and outputs a result of the determination. Here, the photographic composition information includes information for changing the photographic composition of the first portable terminal 101, and is classified into first photographic composition information that includes a reference sensor change value indicating a change value associated with a movement of the second portable terminal 103 and second photographic composition information that includes a reference image change value indicating a change value between images captured in the second portable terminal 103.

In this example, when the first controller 201 receives the first photographic composition information, the first controller 201 determines the photographic composition of the first portable terminal 101 based on the reference sensor change value included in the first photographic composition information. Also, when the first controller 201 receives the second photographic composition information, the first controller 201 determines the photographic composition of the first portable terminal 101 based on the reference image change value included in the second photographic composition information.

When information associated with the photographic composition of the portable terminal 101 is identical to the photographic composition information received from the second portable terminal 103, the first controller 201 outputs a first alarm to recommend capturing an image. Conversely, when the information associated with the photographic composition of the first portable terminal 101 is different from the photographic composition information received from the second portable terminal 103, the first controller 201 outputs a second alarm including an image, a sound, a vibration and the like for changing a photographic composition.

An operation of outputting an alarm using the first photographic composition information will be described in detail. The first controller 201 senses a motion of the first portable terminal 101 using the first motion sensor 211, and generates a sensor change value. Here, the sensor change value indicates a sensor change value that is sensed in association with the motion of the first portable terminal 101, and includes at least one of an angle change value, a travel direction change value, a travel distance change value, and the like.

The first controller 201 detects the first photographic composition information, and detects the reference sensor change value from the detected first photographic composition information by analyzing the detected first photographic information. Here, the reference sensor change value indicates a sensor change value sensed in association with a motion of the second portable terminal 103, and includes at least one of a reference angle change value, a reference travel direction change value, a reference travel distance change value, and the like.

The first controller 201 compares the generated sensor change value and the reference sensor change value. In this example, the first controller 201 compares the angle change value, the travel direction change value, the travel distance change value with the reference angle change value, the reference travel direction change value, the reference travel distance change value, respectively. When the angle change value and the reference angle change value are identical, the travel direction change value and the reference travel direction change value are identical, and the travel distance change value and the reference travel distance change value are identical, the first controller 201 determines that the sensor change value and the reference sensor change value are identical. Otherwise, the first controller 201 determines that the sensor change value and the reference sensor change value are different.

When the sensor change value and the reference sensor change value are identical, the first controller 201 outputs a first alarm to recommend capturing an image. Here, the first alarm is an alarm to recommend capturing an image, and includes at least one of an image, a sound, and a vibration. The alarm is to inform a user that the photographic composition of the first portable terminal 101 is a photographic composition desired by a user of the second portable terminal 103.

When the sensor change value and the reference sensor change value are different from each other, the first controller 201 outputs a second alarm that recommends changing the photographic composition of the first potable terminal 101. Here, the second alarm is an alarm to recommend changing the photographic composition of the first potable terminal 101, and includes at least one of an image, a sound, and a vibration. The alarm is to inform a user that the photographic composition of the first portable terminal 101 is different from a photographic composition desired by the user of the second portable terminal 103.

An operation of outputting an alarm using the second photographic composition information will be described in detail. The first controller 201 compares a first preview image and a second preview image using an image processing scheme so as to generate an image change value, and stores the generated image change value in the first memory unit 209. Here, the image change value indicates an image change value between the first image generated in a preview mode of the first portable terminal 101 and a second image, and includes at least one of an angle change value, a travel direction change value, a contrast change value, and the like. The preview mode is a mode for displaying an image that is expected to be captured before an image is captured.

The first controller 201 detects the second photographic composition information, and analyzes the detected second photographic composition information so as to detect the reference image change value from the detected second photographic composition information. Here, the reference image change value indicates an image change value between images generated by the second portable terminal 103, and includes a reference angle change value, a reference travel direction change value, a reference contrast change value, and the like.

The first controller 201 compares the generated image change value and the reference image change value. In this example, the first controller 201 compares the angle change value, the travel direction change value, and the contrast change value with the reference angle change value, the reference travel direction change value, and the reference contrast change value, respectively. When the angle change value and the reference angle change value are identical, the travel direction change value and the reference travel direction change value are identical, and the contrast change value and the reference contrast change value are identical, the first controller 201 determines that the image change value and the reference image change value are identical. Otherwise, the first controller 201 determines that the image change value and the reference image change value are different.

When the image change value and the reference image change value are identical, the first controller 201 outputs a first alarm to recommend capturing an image. When the image change value and the reference image change value are different, the first controller 201 outputs a second alarm to recommend changing a photographic composition of the first portable terminal 101.

The first controller 201 determines whether capturing a second image is requested by a user. When capturing the second image is requested, the first controller 201 generates the second image using the first camera unit 203, and stores the generated second image in the first memory unit 209.

Figure 3:
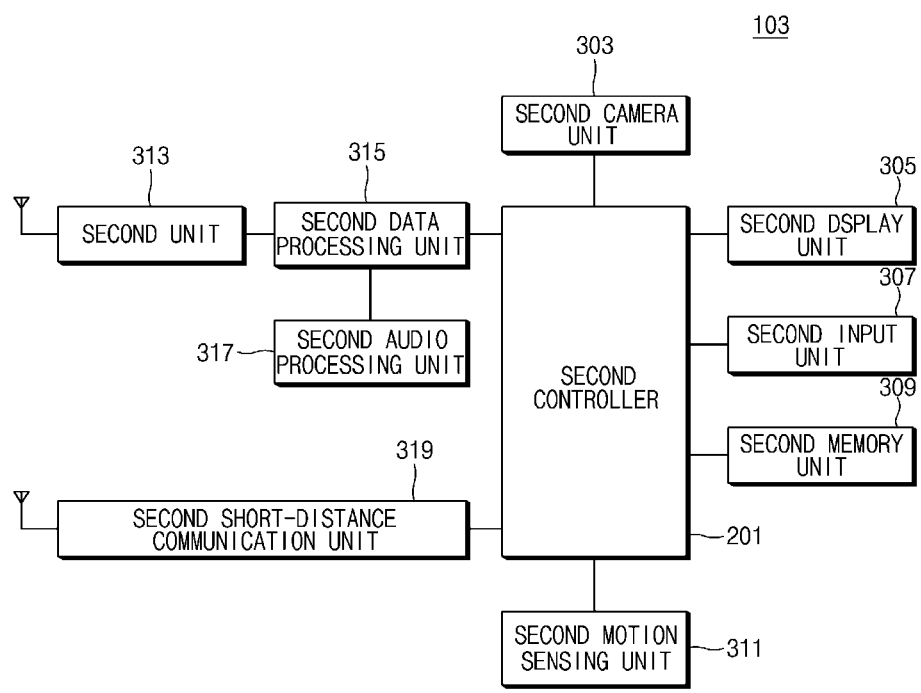
FIG. 3 is a block diagram illustrating a second portable terminal according to an embodiment of the present disclosure.

FIG. 3 is a block diagram of the second portable terminal 103 according to an embodiment of the present disclosure.

Referring to FIG. 3, the second portable terminal 103 includes a second controller 301, a second camera unit 303, a second display unit 305, a second input unit 307, a second memory unit 309, a second motion sensing unit 311, a second RF unit 313, a second data processing unit 315, a second audio processing unit 317, and a second short-distance communication unit 319.

Each component element will be described as follows. The second RF unit 313 performs a wireless communication function of a portable terminal. In particular, the second RF unit 313 includes a wireless transmitter to up-convert and amplify a frequency of a transmitted signal, a wireless receiver to low noise amplify and down-convert a received signal, and the like. The second data processing unit 315 includes a transmitter that encodes and modulates a transmitted signal, a receiver that demodulates and decodes a received signal, and the like. Here, the second data processing unit 315 is formed of a modem and a codec, and the codec includes a data codec that processes packet data and the like, and an audio codec that processes an audio signal such as a voice and the like.

The second audio processing unit 317 plays back, through a speaker, a received audio signal output from the second data processing unit 315, and transmits an audio signal, which is generated from a microphone, to the second data processing unit 315. The second input unit 307 includes keys used for inputting number and character information and function keys used for setting various functions. The second display unit 305 displays an image signal in a screen, and displays data of which output is requested by the second controller 301. When the second display unit 305 is embodied as a touch display screen scheme, for example, a capacitive scheme, a resistive scheme, or the like, the second input unit 307 may include a minimum number of predetermined keys, and the second display unit 305 may be substituted for a part of a key input function of the second input unit 307.

The second memory unit 309 includes a program memory and a data memory. Here, the program memory stores a booting and operating system for controlling general operations of a portable terminal, and the data memory stores various data generated while a portable terminal operates. The second short-distance communication unit 319 performs short-distance communication with the first portable terminal 101 based on a control of the second controller 301. For example, the short-distance communication may be WiFi or Bluetooth.

The second camera unit 303 captures an image of a subject, generates an image, and outputs the generated image to the second controller 301. The second motion sensing unit 311 senses a motion of the second portable terminal 103, and outputs the sensed result to the second controller 301. For example, the second motion sensing unit 311 includes a geomagnetic field sensor and an acceleration sensor. The second motion sensing unit 311 generates at least one of a travel direction sensor value, a travel distance sensor value, and an angle sensor value of the second portable terminal 103 using the geomagnetic field sensor and the acceleration sensor, and outputs at least one of the generated travel direction sensor value, the travel distance sensor value, and the angle sensor value to the second controller 301.

The second controller 301 controls general operations of a portable terminal. For example, the second controller 301 determines whether a first image is received from the first portable terminal 101. When the first image is received, the second controller 301 stores the received first image, and displays the stored first image. The second controller 301 determines whether changing a photographic composition is requested by a user. Here, the request for changing a photographic composition is requested for changing a photographic composition for a second image to be captured in the first portable terminal 101 after the first image. In this example, when at least one of inputting a touch, inputting a haptic input, moving the second portable terminal 103 in a selected direction, and pressing a predetermined button of the second portable terminal 103 is selected, the second controller 301 determines that changing the photographic composition is requested.

When changing the photographic composition is requested, the second controller 301 generates photographic composition information for a photographic composition of the second image. Here, the photographic composition information includes information for changing the photographic composition of the first portable terminal 101, and is classified into first photographic composition information that includes a reference sensor change value indicating a change value of a movement of the second portable terminal 103 and second photographic composition information that includes a reference image change value indicating a change value between images captured in the second portable terminal 103.

An operation of generating the first photographic composition information will be described in detail. The second controller 301 determines whether tracing a movement of the second portable terminal 103 is requested by a user of the second portable terminal 103 or a predetermined condition. Here, a predetermined first condition includes a case in which a movement of the second portable terminal 103 is sensed within a predetermined time after the first image is received.

When tracing the movement is requested, the second controller 301 senses the movement of the second portable terminal 103 using the second motion sensing unit 311, and generates a sensor change value of the movement of the second portable terminal 103 until tracing the movement is terminated. The second controller 301 changes a composition of the first image based on the sensed movement using an image estimation scheme, and displays the changed first image. Here, the image estimation scheme estimates a change in a composition of an image based on the movement of the second portable terminal 103, and reflects the estimated composition change to the first image so as to change the first image.

The second controller 301 determines whether termination of tracing the movement is requested by a user or a predetermined condition. Here, a predetermined second condition includes a case in which a movement of the second terminal 103 is not sensed within a predetermined time after the second portable terminal 103 moves.

When termination of tracing the movement is requested, the second controller 301 generates a reference sensor change value indicating a sensor change value of the second motion sensing unit 311 from when tracing the movement of the second portable terminal 103 is requested to when termination of tracing the movement is requested. Here, the reference sensor change value includes at least one of a reference angle change value, a reference travel direction change value, a reference travel distance change value, and the like.

The second controller 301 generates the first photographic composition information including the generated reference sensor change value.

An operation of generating the second photographic composition information will be described in detail. The second controller 301 determines whether capturing a third image is requested by the user. When capturing the third image is requested, the second controller 301 generates the third image using the second camera unit 303, and stores the generated third image in the second memory unit 309.

The second controller 301 determines whether capturing a fourth image is requested by the user. When capturing the fourth image is requested, the second controller 301 generates the fourth image using the second camera unit 303, and stores the fourth image in the second memory unit 309.

The second controller 301 compares the third image and the fourth image using an image processing scheme, and generates a reference image change value based on a result of comparison. Here, the image processing scheme is a scheme that compares the third image and the fourth image, and extracts a different between the third image and the fourth image based on the third image. The reference image change value includes at least one of a reference angle change value, a reference travel direction change value, a reference contract change value, and the like.

The second controller 301 generates the second photographic composition information including the generated reference image change value.

The second controller 301 transmits the generated photographic composition information to the first portable terminal 101. In this example, the second controller 301 transmits the photographic composition information through a short-distance wireless composition scheme, or the third or fourth generation mobile communication scheme.

Figure 4:
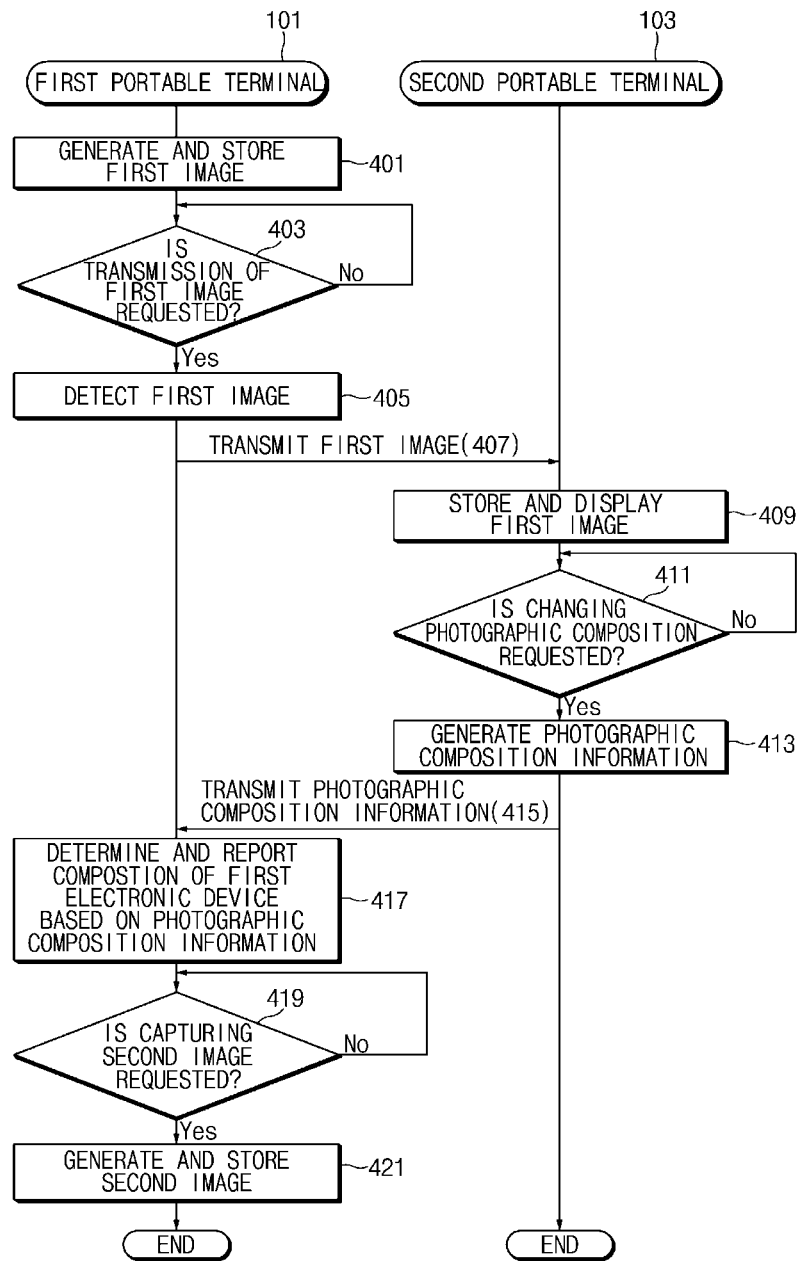
FIG. 4 is a flowchart illustrating a process of generating an image in a communication system according to an embodiment of the present disclosure.

FIG. 4 is a flowchart illustrating a process that generates an image in a communication system according to an embodiment of the present disclosure.

Referring to FIG. 4, in operation 401, the first portable terminal 101 generates a first image using the first camera unit 203, stores the generated first image, and proceeds with operation 403. In operation 403, the first portable terminal 101 determines whether transmission of the first image is requested.

In this example, the first portable terminal 101 determines that transmission of the first image is requested when execution of a predetermined function is requested by a user after the first image is displayed. Also, when the first image is selected after the predetermined function is executed by the user, the first portable terminal 101 determines that transmission of the first image is requested. Here, the predetermined function includes an air view function or a mirror image function. The air view function or the mirror image function refers to a function that transmits an image that is provided or capable of being provided in the first portable terminal 101 to the second portable terminal 103 so that the second portable terminal 103 displays the transmitted image.

When transmission of the first image is requested, the first portable terminal 101 proceeds with operation 405, otherwise, operation 403 is repeatedly performed.

In operation 405, the first portable terminal 101 detects the first image from at least one stored image, transmits the detected first image to the second portable terminal 103 in operation 407, and the second potable terminal proceeds with operation 409. In this example, the first portable terminal 101 transmits the first image through a short-distance wireless communication scheme, or the third or fourth generation mobile communication scheme. Here, the short-distance wireless communication scheme includes Bluetooth, WiFi, or the like, and the third or fourth generation mobile communication scheme includes 3GPP or LTE.

In operation 409, the second portable terminal 103 receives the first image from the first portable terminal 101, stores the received first image, displays the stored first image, and proceeds with operation 411.

In operation 411, the second portable terminal 103 determines whether changing a photographic composition is requested by the user. Here, the request for changing the photographic composition is requested for changing a photographic composition for a second image to be captured in the first portable terminal 101 after the first image.

When changing the photographic composition is requested, the second portable terminal 103 proceeds with operation 413, otherwise, the second portable terminal 103 repeatedly performs operation 411.

In operation 413, the second portable terminal 103 generates photographic composition information for a photographic composition of the second image, and transmits the generated photographic composition information to the first portable terminal 101 in operation 415. In this example, the second portable terminal 103 transmits the photographic composition information through a short-distance wireless communication scheme, or the third or fourth generation mobile communication scheme. Here, the photographic composition information includes information for changing a photographic composition of the first portable terminal 101, and is classified into first photographic composition information that includes a reference sensor change value indicating a change value of a movement of the second portable terminal 103, and second photographic composition information that includes a reference image change value indicating a change value between images captured in the second portable terminal 103.

In operation 417, the first portable terminal 101 receives the photographic composition information, determines the photographic composition of the first portable terminal 101 based on the received photographic composition information, outputs a result of the determination, and proceeds with operation 419. In this example, when the first portable terminal 101 receives the first photographic composition information, the first portable terminal 101 determines the photographic composition of the first portable terminal 101 based on the reference sensor change value included in the first photographic composition information. Also, when the first portable terminal 101 receives the second photographic composition information, the first portable terminal 101 determines the photographic composition of the first portable terminal 101 based on the reference image change value included in the second photographic composition information.

When information associated with the photographic composition of the first portable terminal 101 is identical to the photographic composition information received from the second portable terminal 103, the first portable terminal 101 outputs a first alarm to recommend capturing an image. Conversely, when information associated with the photographic composition of the first portable terminal 101 is different from the photographic composition information received from the second portable terminal 103, the first portable terminal 101 outputs a second alarm including at least one of an image, a sound, a vibration for changing a photographic composition.

In operation 419, the first portable terminal 101 determines whether capturing a second image is requested by the user. When capturing the second image is requested, the first portable terminal 101 proceeds with operation 421, otherwise, the first portable terminal 101 repeatedly performs operation 419.

In operation 421, the first portable terminal 101 generates the second image using the first camera unit 203, and stores the generated second image.

Figure 5:
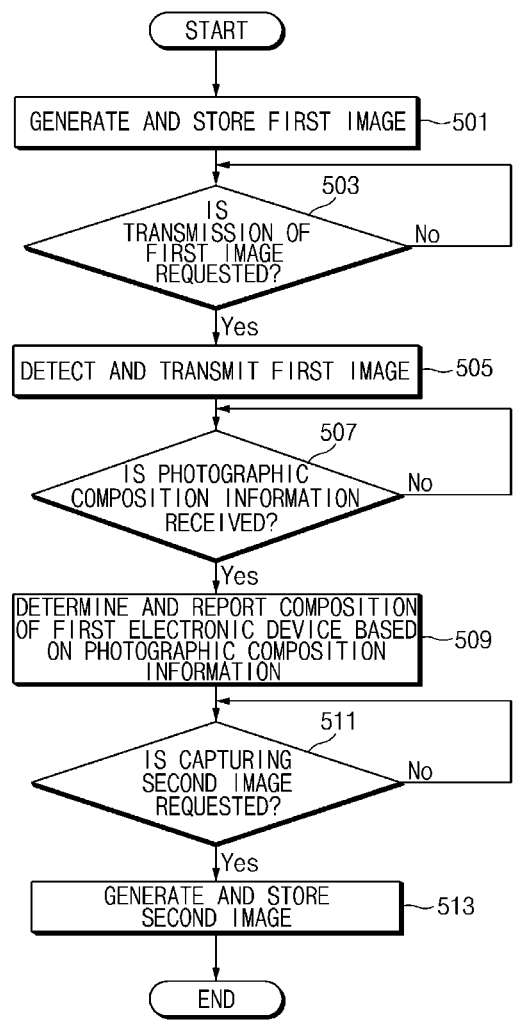
FIG. 5 is a flowchart illustrating a process of generating an image in a first portable terminal according to an embodiment of the present disclosure.

FIG. 5 is a flowchart illustrating a process that generates an image in the first portable terminal 101 according to an embodiment of the present disclosure.

Referring to FIG. 5, in operation 510, the first controller 201 of the first portable terminal 101 generates a first image using the first camera unit 203, stores the generated first image in the first memory unit 209, and proceeds with operation 503. Here, the first image is an image generated in a preview mode of the first camera unit 203. The preview mode is a mode for displaying an image that is expected to be captured before an image is captured.

In operation 503, the first controller 201 determines whether transmission of the first image is requested. In this example, when execution of a predetermined function is requested by a user after the first image is displayed, the first controller 201 determines that transmission of the first image is requested. Also, when the first image is selected after the predetermined function is executed by the user, the first controller 201 determines that transmission of the first image is requested.

Here, the predetermined function includes an air view function or a mirror image function, and the air view function or the mirror image function refers to a function that transmits an image that is provided or capable of being provided in the first portable terminal 101 to the second portable terminal 103, so that the second portable terminal 103 displays the transmitted image.

When transmission of the first image is requested, the first controller 201 proceeds with operation 505, otherwise, the first controller 201 repeatedly performs operation 503.

In operation 505, the first controller 201 detects the first image from at least one image stored in advance in the first memory unit 209, transmits the detected first image to the second portable terminal 103, and proceeds with operation 507. In this example, the first controller 201 transmits the first image through a short-distance wireless communication scheme, or the third or fourth generation mobile communication scheme. Here, the short-distance wireless communication scheme includes Bluetooth, WiFi, or the like, and the third or fourth generation mobile communication scheme includes 3GPP or LTE.

In operation 507, the first controller 201 receives photographic composition information from the second portable terminal 103, determines a photographic composition of the first portable terminal 101 based on the received photographic composition information, outputs a result of the determination, and proceeds with operation 509. Here, the photographic composition information includes information for changing a photographic composition of the first portable terminal 101, and is classified into first photographic composition information that includes a reference sensor change value indicating a change value of a movement of the second portable terminal 103 and second photographic composition information that includes a reference image change value indicating a change value between images captured in the second portable terminal 103.

In this example, when the first controller 201 receives the first photographic composition information, the first controller 201 determines a photographic composition of the first portable terminal 101 based on the reference sensor change value included in the first photographic composition information. Also, when the first controller 201 receives the second photographic composition information, the first controller 201 determines the photographic composition of the first portable terminal 101 based on the reference image change value included in the second photographic composition information.

When information associated with the photographic composition of the first portable terminal 101 is identical to the photographic composition information received from the second portable terminal 103, the first controller 201 outputs a first alarm to recommend capturing an image. Conversely, when the information associated with the photographic composition of the first portable terminal 101 is different from the photographic composition information received from the second portable terminal 103, the first controller 201 outputs a second alarm including at least one of an image, a sound, a vibration for changing a photographic composition.

An operation of outputting an alarm using the first photographic composition information will be described in detail with reference to FIG. 6.

Figure 6:
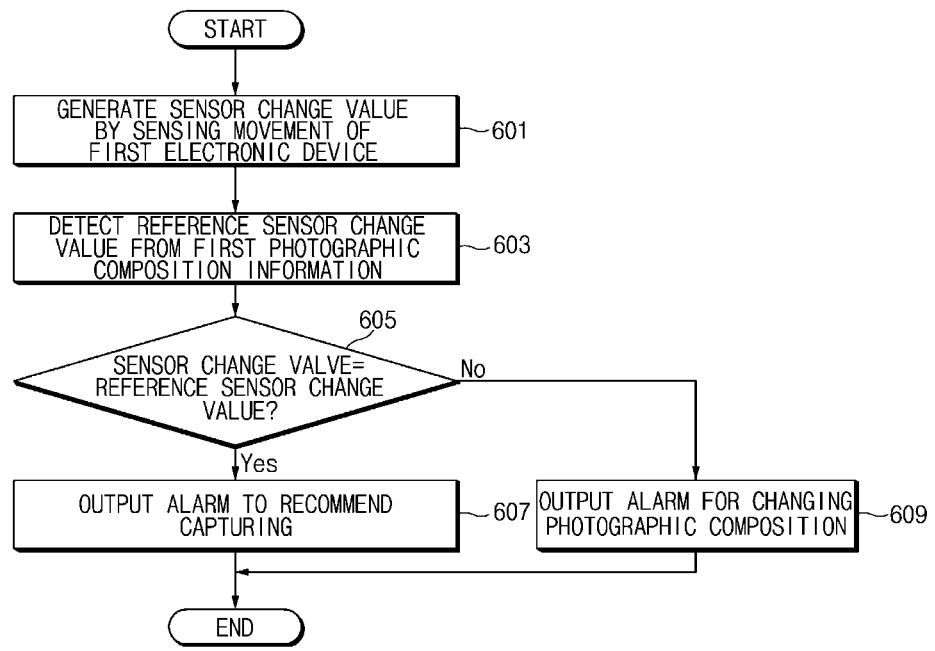
FIG. 6 is a flowchart illustrating a process of changing a photographic composition in a first portable terminal according to a first embodiment of the present disclosure.

FIG. 6 is a flowchart illustrating a process of changing a photographic composition in the first portable terminal 101 according to a first embodiment of the present disclosure.

Referring to FIG. 6, in operation 601, the first controller 201 generates a sensor change value by sensing a movement of the first portable terminal 101 using the first motion sensing unit 211, and proceeds with operation 603. Here, the sensor change value indicates a sensor change value sensed in association with the movement of the first portable terminal 101, and includes at least one of an angle change value, a travel direction change value, a travel distance change value, and the like.

In operation 603, the first controller 201 detects first photographic composition information, detects a reference sensor change value from the detected first photographic composition information by analyzing the detected first photographic composition information, and proceeds with operation 605. Here, the reference sensor change value indicates a sensor change value sensed in association with a movement of the second portable terminal 103, and includes at least one of a reference angle change value, a reference travel direction change value, a reference travel distance change value, and the like.

In operation 605, the first controller 201 compares the generated sensor change value and the reference sensor change value. When the sensor change value and the reference sensor change value are identical, the first controller 201 proceeds with operation 607. Otherwise, the first controller 201 proceeds with operation 609. In this example, the first controller 201 compares the angle change value, the travel direction change value, and the travel distance change value with the reference angle change value, the reference travel direction change value, and the reference travel distance change value, respectively. When the angle change value and the reference angle change value are identical, the travel direction change value and the reference travel direction change value are identical, and the travel distance change value and the reference travel distance change value are identical, the first controller 201 determines that the sensor change value and the reference sensor change value are identical. Otherwise, the first controller 201 determines that the sensor change value and the reference sensor change value are different.

In operation 607, the first controller 201 outputs a first alarm to recommend capturing an image. Here, the first alarm is an alarm to recommend capturing an image, and includes at least one of an image, a sound, and a vibration. The alarm is to inform a user that a photographic composition of the first portable terminal 101 is a photographic composition desired by a user of the second portable terminal 103.

In operation 609, the first controller 201 outputs a second alarm to recommend changing a photographic composition of the first portable terminal 101. Here, the second alarm is an alarm to recommend changing the photographic composition of the first portable terminal 101, and includes at least one of an image, a sound, and a vibration. The alarm is to inform the user that the photographic composition of the first portable terminal 101 is different from the photographic composition desired by the user of the second portable terminal 103.

An operation of outputting an alarm using the second photographic composition information will be described in detail with reference to FIG. 7.

Figure 7:
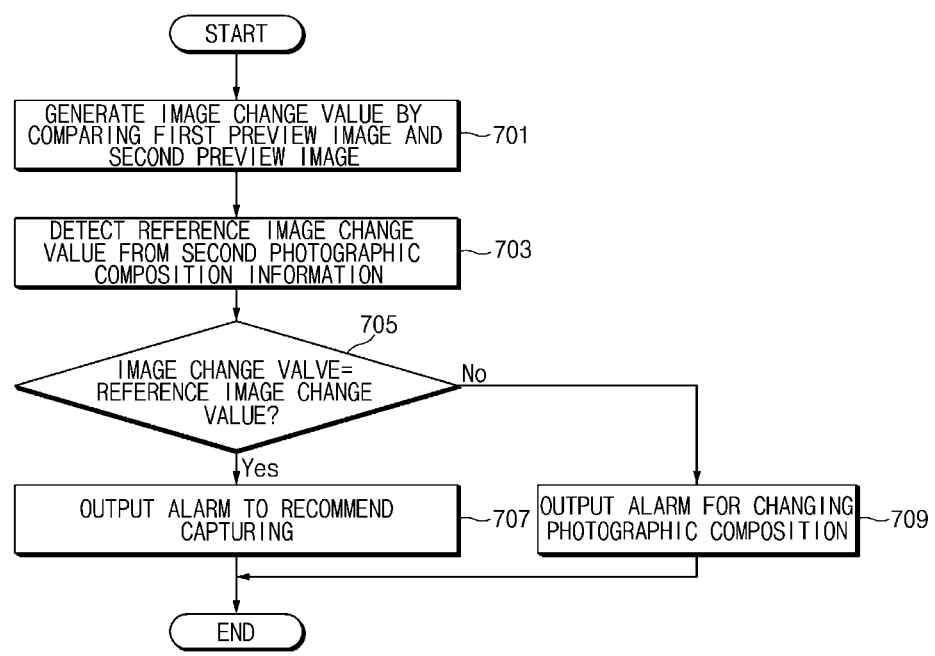
FIG. 7 is a flowchart illustrating a process of changing a photographic composition in a first portable terminal according to a second embodiment of the present disclosure.

FIG. 7 is a flowchart illustrating a process of changing a photographic composition in the first portable terminal 101 according to a second embodiment of the present disclosure.

Referring to FIG. 7, in operation 701, the first controller 201 generates an image change value by comparing a first preview image and a second preview image, stores the generated image change value in the first memory unit 209, and proceeds with operation 703. Here, the image change value indicates an image change value between a first image generated in a preview mode of the first portable terminal 101 and a second image, and includes at least one of an angle change value, a travel direction change value, a contrast change value, and the like. The preview mode is a mode for displaying an image that is expected to be captured before an image is captured.

In operation 703, the first controller 201 detects second photographic composition information, detects a reference image change value from the detected second photographic composition information by analyzing the detected second photographic composition information, and proceeds with operation 705. Here, the reference image change value indicates an image change value between images generated in the second portable terminal 103, and includes at least one of a reference angle change value, a reference travel direction change value, a reference contrast change value, and the like.

In operation 705, the first controller 201 compares the generated image change value and the reference image change value. When the image change value and the reference image change value are identical, the first controller 201 proceeds with operation 707, otherwise, the first controller 201 proceeds with operation 709. In this example, the first controller 201 compares the angle change value, the travel direction change value, and the contrast change value with the reference angle change value, the reference travel direction change value, and the reference contrast change value, respectively. When the angle change value and the reference angle change value are identical, the travel direction change value and the reference travel direction change value are identical, and the contrast change value and the reference contrast change value are identical, the first controller 201 determines that the image change value and the reference image change value are identical. Otherwise, the first controller 201 determines that the image change value and the reference image change value are different.

In operation 707, the first controller 201 outputs a first alarm to recommend capturing an image. Here, the first alarm is an alarm to recommend capturing an image, and includes at least one of an image, a sound, and a vibration. The alarm is to inform a user that a photographic composition of the first portable terminal 101 is a photographic composition desired by a user of the second portable terminal 103.

In operation 709, the first controller 201 outputs a second alarm to recommend changing the photographic composition of the first portable terminal 101. Here, the second alarm is an alarm to recommend changing the photographic composition of the first portable terminal 101, and includes at least one of an image, a sound, and a vibration. The alarm is to inform the user that the photographic composition of the first portable terminal 101 is different from the photographic composition desired by the user of the second portable terminal 103.

Referring again to FIG. 5, in operation 511, the first controller 201 determines whether capturing a second image is requested by the user. When capturing the second image is requested, the first controller 201 proceeds with operation 513, otherwise, the first controller 201 repeatedly performs operation 511. In operation 513, the first controller 201 generates the second image using the first camera unit 203, and stores the second image in the first memory unit 209.

Figure 8:
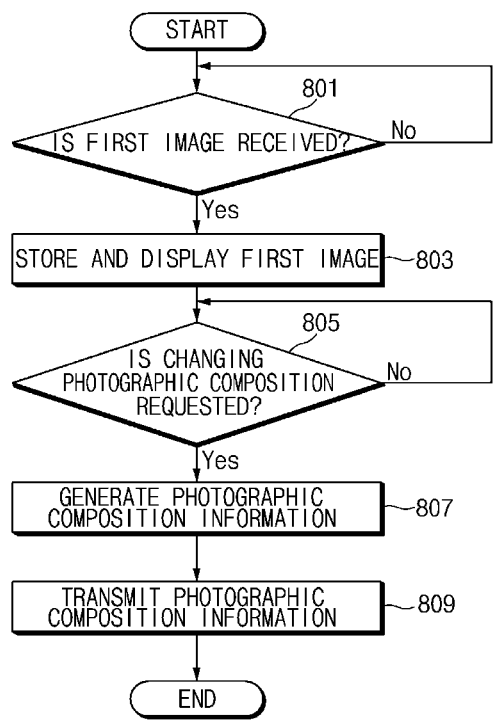
FIG. 8 is a flowchart illustrating a process of providing photographic composition information in a second portable terminal according to an embodiment of the present disclosure.

FIG. 8 is a flowchart illustrating photographic composition information in the second portable terminal 103 according to an embodiment of the present disclosure.

Referring to FIG. 8, in operation 801, the second controller 301 of the second portable terminal 103 determines whether a first image is received from the first portable terminal 101. When the first image is received, the second controller 301 proceeds with operation 803, otherwise, the first controller 301 repeatedly performs operation 801.

In operation 803, the second controller 301 stores the received first image, displays the stored first image, and proceeds with operation 805. In operation 805, the second controller 301 determines whether changing a photographic composition is requested by a user. Here, the request for changing the photographic composition is requested for changing a photographic composition for a second image to be captured in the first portable terminal 101 after the first image. In this example, when at least one of inputting a touch, inputting a haptic input, a movement of the second portable terminal 103 in a selected direction, and pressing a predetermined button of the second portable terminal 103 is selected, the second controller 301 determines that changing the photographic composition is requested.

When changing the photographic composition is requested, the second controller 301 proceeds with operation 807, otherwise, the second controller 301 repeatedly performs operation 805.

In operation 807, the second controller 301 generates photographic composition information for the photographic composition of the second image, and proceeds with operation 809. Here, the photographic composition information includes information for changing the photographic composition of the first portable terminal 101, and is classified into first photographic composition information that includes a reference sensor change value indicating a change value of a movement of the second portable terminal 103 and second photographic composition information that includes a reference image change value indicating a change value between images captured in the second portable terminal 103.

An operation of generating the first photographic composition information will be described in detail with reference to FIG. 9.

Figure 9:
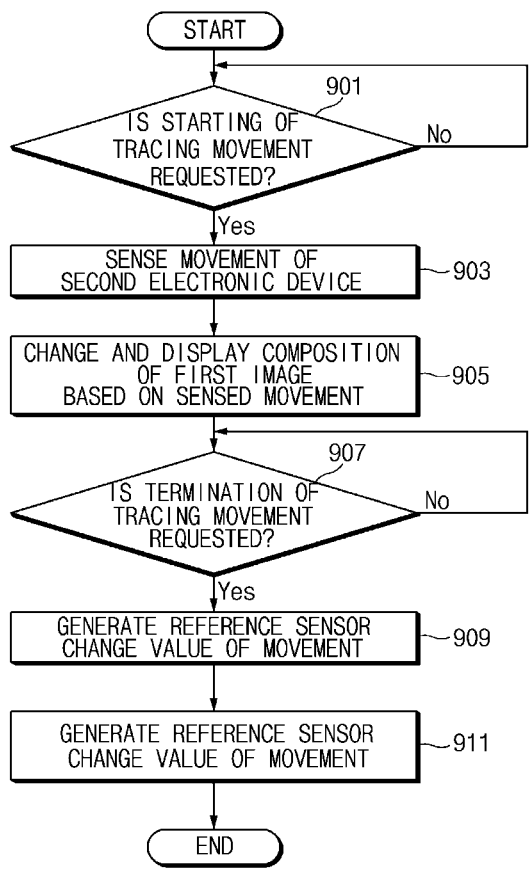
FIG. 9 is a flowchart illustrating a process of generating first photographic composition information in a second portable terminal according to the first embodiment of the present disclosure.

FIG. 9 is a flowchart illustrating a process of generating first photographic composition information in the second portable terminal 103 according to the first embodiment of the present disclosure.

Referring to FIG. 9, in operation 901, the second controller 301 determines whether tracing a movement of the second portable terminal 103 is requested by a user of the second portable terminal 103 or a predetermined condition. Here, a first predetermined condition includes a case in which a movement of the second portable terminal 103 is sensed within a predetermined time after a first image is received.

When tracing of sensing the movement is requested, the second controller 301 proceeds with operation 903, otherwise, the second controller 301 repeatedly performs operation 901.

In operation 903, the second controller 301 generates a sensor change value of a movement of the second portable terminal 103 by sensing the movement of the second portable terminal 103 through the second motion sensing unit 311 until tracing the movement is terminated, and proceeds with operation 905. In operation 905, the second controller 301 changes a composition of the first image based on the sensed movement using an image estimation scheme, displays the changed first image, and proceeds with operation 907. Here, the image estimation scheme is a scheme that estimates a change in a composition of an image based on the movement of the second portable terminal 103, reflects the estimated composition change to the first image, and changes the first image.

In operation 907, the second controller 301 determines whether termination of tracing the movement is requested by the user or a predetermined condition. Here, a second predetermined condition includes a case in which the movement of the second portable terminal 103 is not sensed within a predetermined time after the second portable terminal 103 moves.

When termination of tracing the movement is requested, the second controller 301 proceeds with operation 909, otherwise, the second controller 301 repeatedly performs operation 907.

In operation 909, the second controller 301 generates a reference sensor change value indicating a sensor change value of the second motion sensing unit 311 from when tracing the movement of the second portable terminal 103 is requested to when termination of tracing the movement is requested, and proceeds with operation 911. Here, the reference sensor change value includes at least one of a reference angle change value, a reference travel direction change value, a reference travel distance change value, and the like.

In operation 911, the second controller 301 generates the first photographic composition information including the generated reference sensor change value.

An operation of generating the second photographic composition information will be described in detail with reference to FIG. 10.

Figure 10:
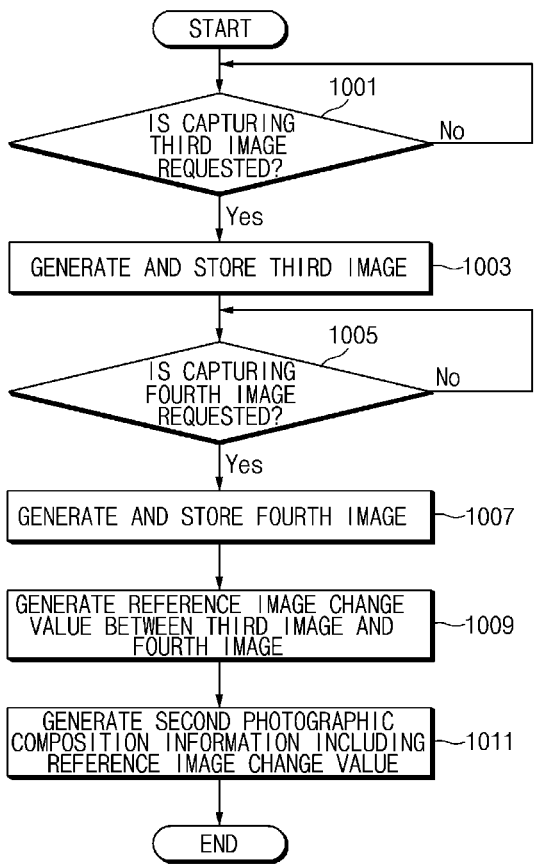
FIG. 10 is a flowchart illustrating a process of generating second photographic composition information in a second portable terminal according to the second embodiment of the present disclosure.

FIG. 10 is a flowchart illustrating a process of generating second photographic composition information in the second portable terminal 103 according to the second embodiment of the present disclosure.

Referring to FIG. 10, in operation 1001, the second controller 301 determines whether capturing a third image is requested by a user. When capturing the third image is requested, the second controller 301 proceeds with operation 1003, otherwise, the second controller 301 proceeds with operation 1001.

In operation 1003, the second controller 301 generates the third image using the second camera unit 303, stores the generated third image in the second memory unit 309, and proceeds with operation 1005.

In operation 1005, the second controller 301 determines whether capturing a fourth image is requested by the user, when capturing the fourth image is requested, the second controller 301 proceeds with operation 1007, otherwise, the second controller 301 proceeds with operation 1005.

In operation 1007, the second controller 301 generates the fourth image using the second camera unit 303, stores the generated fourth image in the second memory 309, and proceeds with operation 1009.

In operation 1009, the second controller 301 compares the third image and the fourth image using an image processing scheme, generates a reference image change value based on a result of comparison, and proceeds with operation 1011. Here, the image processing scheme is a scheme that compares the third image and the fourth image, and extracts a different between the third image and the fourth image based on the third image. The reference image change value includes at least one of a reference angle change value, a reference travel direction change value, a reference contrast change value, and the like.

In operation 1011, the second controller 301 generates the second photographic composition information including the generated reference image change value.

Referring again to FIG. 8, in operation 809, the second controller 301 transmits the generated photographic composition information to the first portable terminal 101. In this example, the second controller 301 transmits the photographic composition information through a short-distance wireless communication scheme, or the third or fourth generation mobile communication scheme.

Figure 11:
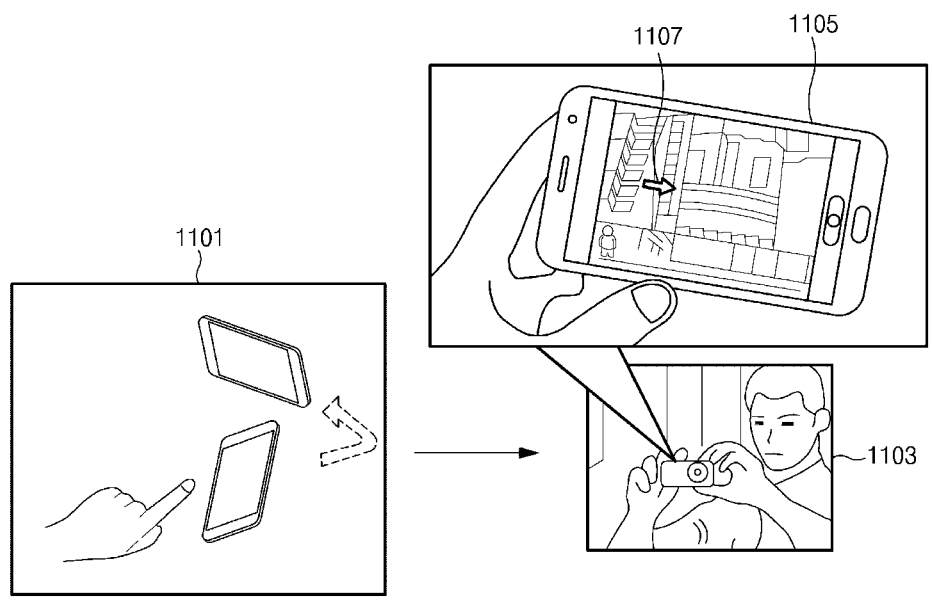
FIG. 11 illustrates a screen for informing a change of a photographic composition according to the first embodiment of the present disclosure.

FIG. 11 illustrates a screen for informing a change of a photographic composition according to a first embodiment of the present disclosure.

Referring to FIG. 11, a screen 1101 shows that the second portable terminal 103 is moved by a user of the second portable terminal 103. In this example, when a screen that displays a first image is touched by the user, the second portable terminal 103 determines that tracing a movement of the second portable terminal 103 is requested. The second portable terminal 103 generates first photographic composition information including a reference sensor change value associated with a movement of the second portable terminal 103, and transmits the first photographic composition information to the first portable terminal 101.

A screen 1103 shows that the first portable terminal 101 is moved by a user of the first portable terminal 101. In this example, the first portable terminal 101 generates a sensor change value associated with a movement of the first portable terminal, compares the generated sensor change value and the reference sensor change value included in the first photographic composition information, and determines whether a photographic composition of the first portable terminal 101 is a photographic composition desired by the user of the second portable terminal 103.

A screen 1105 shows an arrow 1107 that recommends changing the photographic composition of the first portable terminal 101. In this example, when the sensor change value and the reference sensor change value are different, the first portable terminal 101 determines a travel direction of the first portable terminal 101 based on the reference sensor change value, and displays the arrow 1107 indicating the determined travel direction. In this example, the first portable terminal 101 informs the user of the first portable terminal 101 of a desired change in a photographic composition, such as a desired direction, a desired angle, and the like, using at least one of a popup window, a vibration, and a sound, in addition to the arrow 1107.

Figure 12:
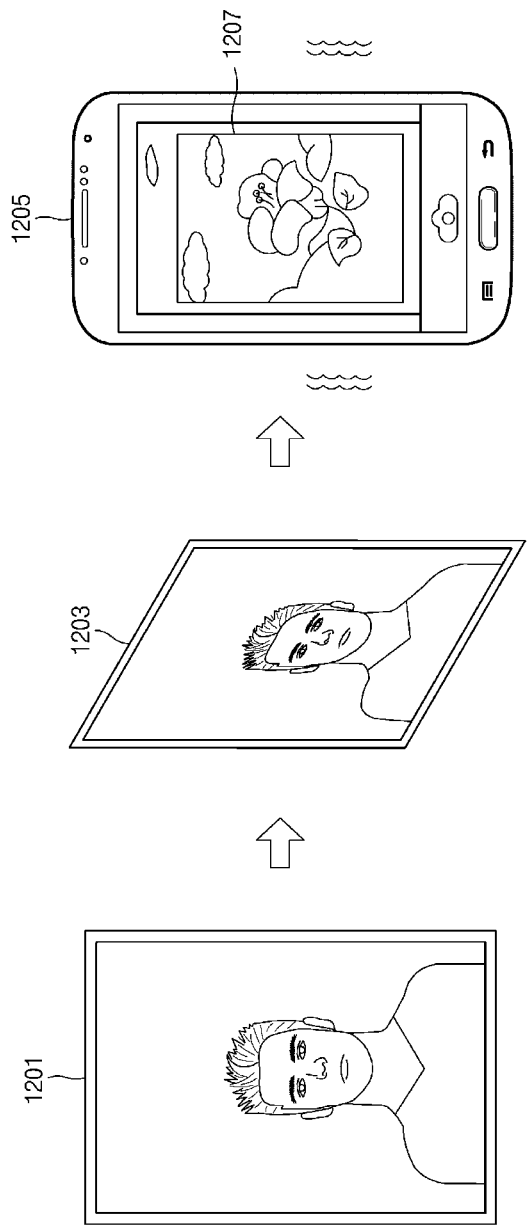
FIG. 12 illustrates a screen for informing a change of a photographic composition according to the second embodiment of the present disclosure.

FIG. 12 illustrates a screen for informing a change of a photographic composition according to a second embodiment of the present disclosure.

Referring to FIG. 12, a screen 1201 shows a third image that the second portable terminal 103 generates using a front side camera of the second portable terminal 103, and a screen 1203 shows a fourth image that the second portable terminal 103 generates using the front side camera unit of the second portable terminal 103.

Subsequently, the second portable terminal 103 generates a reference image change value indicating a difference between the third image and the fourth image using an image processing scheme, and transmits second photographic composition information including the generated reference image change value to the first portable terminal 101.

When the first portable terminal 101 receives second photographic composition information, the first portable terminal 101 generates an image change value indicating a difference between a first preview image and a second preview image using the image processing scheme. The first portable terminal 101 compares the image change value and the reference image change value so as to determine whether the photographic composition of the first portable terminal 101 is a photographic composition desired by the user of the second portable terminal 103.

A screen 1205 is a screen for the first portable terminal 101 that outputs an image that recommends capturing an image. In this example, when the image change value and the reference image change value are identical, the first portable terminal 101 displays a quadrangular image such as a diagram 1207, and recommends a user to capture an image by outputting a vibration. In this example, the first portable terminal 101 informs the user of the first portable terminal 101 of the recommendation of capturing an image using at least one of a popup window and a sound, in addition to the quadrangular image 1207 and the vibration.

By performing the described operations, the present disclosure performs capturing an image with a composition desired by a subject to be captured when an image is captured, by transmitting photographic composition information from an electronic device of the subject to be captured to an electronic device of an image capturer. Also, the present disclosure performs capturing an image with a composition desired by a subject to be captured when an image is captured, by outputting, from the subject to be captured, the desired composition through an alarm using photographic composition information.

The method of controlling a composition of a picture in an electronic device may be embodied as a computer readable code in a non-transitory computer readable recoding medium. The non-transitory computer-readable recording medium includes all the types of recording devices in which data readable by a computer system are stored. As for such a recording medium, for example, a Read Only Memory (ROM), a Random Access Memory (RAM), an optical disc, a magnetic tape, a floppy disc, a hard disc, or a non-volatile memory may be used. In addition, the non-transitory computer-readable recording medium may be stored with codes which are distributed in computer systems connected by a network such that the codes can be read and executed by a computer in a distributed method.

The term "include," "comprise," "including," or "comprising," specifies disclosed corresponding functions, operations, and components but does not limit additional at least one function, operation, and component. Additionally, in this specification, the meaning of "include," "comprise," "including," or "comprising," specifies a property, a region, a fixed number, a step, a process, an element and/or a component but does not exclude other properties, regions, fixed numbers, steps, processes, elements and/or components.

In this specification, the expression "or" includes any or all combinations of words listed. For example, "A or B" may include A, or may include B, or may include both A and B.

In this specification, the terms 'first' and/or 'second' may be used to describe various elements; however, the elements should not be limited by these terms. For example, the above expressions do not limit the order and/or importance of corresponding components. The expressions are used to distinguish one component from another component. For example, a first user device and a second user device are all user devices and represent different user devices. For example, a first component may be referred to as a second component and vice versa without departing from the scope of the inventive concept.

In this disclosure below, when one part (or element, device, etc.) is referred to as being 'connected' to another part (or element, device, etc.), it should be understood that the former can be 'directly connected' to the latter, or 'electrically connected' to the latter via an intervening part (or element, device, etc.). It will be further understood that when one component is referred to as being 'directly connected' or 'directly linked' to another component, it means that no intervening component is present.

Terms used in this specification are used to describe specific embodiments, and are not intended to limit the scope of the present disclosure. The terms of a singular form may include plural forms unless they have a clearly different meaning in the context.

Otherwise indicated herein, all the terms used herein, which include technical or scientific terms, may have the same meaning that is generally understood by a person skilled in the art. In general, the terms defined in the dictionary should be considered to have the same meaning as the contextual meaning of the related art, and, unless clearly defined herein, should not be understood abnormally or as having an excessively formal meaning.

An electronic device according to various embodiments of the present disclosure may include the above-mentioned portable terminal or at least one of an image collecting device or an image obtaining device. According to an embodiment of the present disclosure, an image collecting device or an image obtaining device described below may be at least a partial configuration of an electronic device. The above-mentioned electronic device may be a device having at least one of a camera function or a communication function. For example, an electronic device may include at least one of smartphones, tablet Personal Computers (PCs), mobile phones, video phones, e-book readers, desktop PCs, laptop PCs, netbook computers, PDAs, PMPs, MP3 players, mobile medical equipment, cameras, or wearable devices (for example, Head-Mounted-Devices (HMDs) such as electronic glasses, electronic clothing, electronic bracelets, electronic necklaces, accessories, electronic tattoos, or smartwatches).

According to an embodiment of the present disclosure, an electronic device may be a smart home appliance having at least one of a camera function or a communication function. The smart home appliance, for example, an electronic device, may include at least one of televisions, Digital Video Disk (DVD) players, audio systems, refrigerators, air conditioners, vacuum cleaners, ovens, microwaves, washing machines, air purifiers, set-top boxes, TV boxes (for example, the Samsung HomeSync™, Apple TV™, or Google TV™), game consoles, electronic dictionaries, electronic key, camcorders, or electronic frames.

According to an embodiment of the present disclosure, an electronic device may include at least one of various medical devices (for example, Magnetic Resonance Angiography (MRA) devices, Magnetic Resonance Imaging (MRI) devices, Computed Tomography (CT) devices, medical imaging devices, ultrasonic devices, etc.), navigation devices, Global Positioning System (GPS) receivers, Event Data Recorders (EDRs), Flight Data Recorders (FDRs), vehicle infotainment devices, marine electronic equipment (for example, marine navigation systems, gyro compasses, etc.), avionics, security equipment, or industrial or household robots.

According to embodiments of the present disclosure, an electronic device may include at least one of part of furniture or buildings/structures having a camera function or a communication function, electronic boards, electronic signature receiving devices, projectors, or various measuring instruments (for example, water, electricity, gas, or radio signal measuring instruments). An electronic device according to an embodiment of the present disclosure may be one of the above-mentioned various devices or a combination thereof. It is apparent to those skilled in the art that the electronic device is not limited to the above-mentioned devices.

Hereinafter, embodiments of the present disclosure will be described in more detail with reference to the accompanying drawings. The term "user" in various embodiments may refer to a person using an electronic device or a device using an electronic device (for example, an artificial intelligent electronic device).

Figure 13:
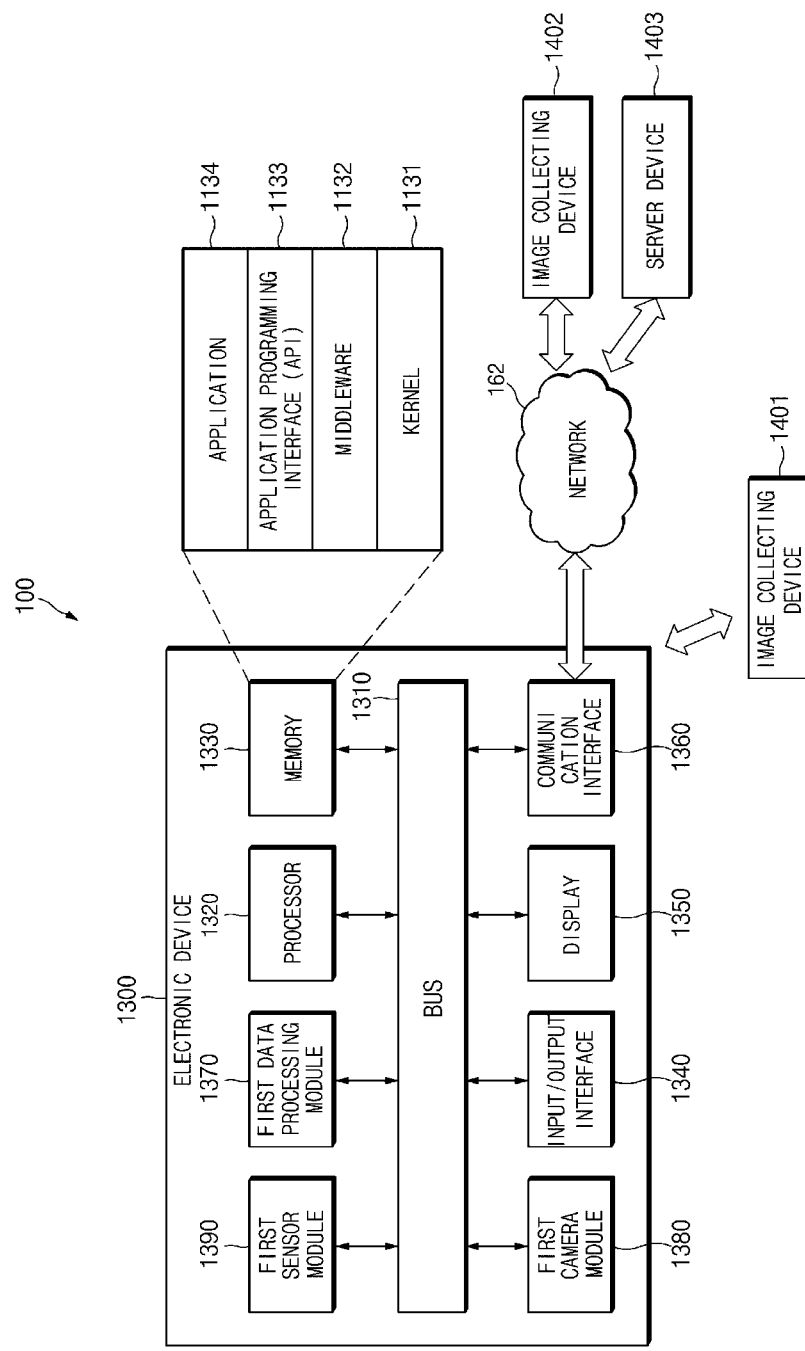
FIG. 13 is a configuration diagram of an image management system including an electronic device relating to image acquisition according to an embodiment of the present disclosure.

FIG. 13 is a configuration diagram of an image management system including an electronic device relating to image acquisition according to an embodiment of the present disclosure.

Referring to FIG. 13, according to an embodiment of the present disclosure, the image management system 100 may include an image acquisition controlling device 1300 (for example, a portable terminal or an electronic device), an image collecting devices 1401 and 1402 (for example, a portable terminal or the electronic device), a server device 1403, and a network 162. Here, the image collecting device 1401 may be one device alone. In an embodiment, the image collecting device 1402 may be a partial configuration of an electronic device including an image collecting function. In an embodiment, the image obtaining device 1300 may also be one device alone and may be a partial configuration supporting image acquisition and processing in an electronic device.

In the image management system, the network 162 may establish a communication channel between the image acquisition controlling device 1300 and the image collecting device 1402. The network 162 may include network device components relating to mobile communication channel establishment. Or, the network 162 may include network device components relating to internet communication channel establishment. The network 162 may support at least one transmission of a reference image (for example, at least one of a preview image or a captured image that the image collecting device 1402 collects) between the image acquisition controlling device 1300 and the image collecting device 1402, guide change information (for example, information relating to a reference guide change displayed on a display of the image acquisition controlling device 1300), and an obtained image (for example, a preview image or a captured image that the image collecting device 1402 collects on the basis of guide change information). Or, the network 162 may deliver a matrix guide (for example, an image obtained by dividing the display of the image acquisition controlling device 1300 into a plurality or areas) of the image acquisition controlling device 1300 to the image collecting device 1402 and may deliver a group image (for example, a plurality of obtained images disposed in designated areas in a matrix guide) that the image collecting device 1402 generates on the basis of a matrix guide to the image acquisition controlling device 1300. Here, the matrix guide may include an arrangement guide designating an arrangement position of a plurality of continuous or non-continuous obtained images.

The server device 1403 may establish a communication channel between the image acquisition controlling device 1300 and the image collecting device 1402 through the network 162. The server device 1403 may process data transmission used for a capturing composition controlling function descried in various embodiments of the present disclosure when it is designed to operate based on a server. In relation to this, the server device 1403 may perform data processing depending on a situation while receiving data, storing data, and delivering data between the image acquisition controlling device 1300 and the image collecting device 1402. For example, the server device 1403 may perform to match a data quality of the image acquisition controlling device 1300 and a data quality of the image collecting device 1402 according to a hardware characteristic difference if the data qualities are different. For example, the server device 1403 may perform at least one of resolution adjustment, size adjustment, and image processing of a reference image, an obtained image, or a group image.

The server device 1403 may control the image collecting device 1402 to deliver an obtained reference image to the image acquisition controlling device 1300. In this operation, the server device 1403 may store the reference image temporarily. The server device 1403 may transmit an obtained image that the image collecting device 1402 collects to the image acquisition controlling device 1300 in response to a request of the image acquisition controlling device 1300. According to an embodiment of the present disclosure, the server device 1403 may transmit an obtained image (for example, at least one of a preview image or a captured image) to the image acquisition controlling device 1300. The obtained image is collected by the image collecting device 1402 when a second reference guide (for example, a specific image displayed on the display of the image collecting device 1402) and a second change guide (for example, an image in which an arrangement state (for example, at least one of a position, a direction, a size, and a color) of the second reference guide displayed on the display of the image collecting device 1402 is changed) are identical (or, in a similar arrangement or a designated arrangement).

According to various embodiments, when a matrix guide is used by at least one of the image acquisition controlling device 300 or the image collecting device 1402, the server device 1403 may deliver a matrix guide that the image acquisition controlling device 300 generates to the image collecting device 1402. The server device 1403 may receive an obtained image (for example, at least one of a preview image or a captured image) that the image collecting device 1402 collects on the basis of the matrix guide and may generate a group image corresponding to the matrix guide on the basis of the received obtained image. Once the group image is generated, the server device 1403 may provide the group image to the image acquisition controlling device 1300.

The image collecting device 1401 may establish a communication channel with the communication interface 1360 of the image acquisition controlling device 1300. For example, the image collecting device 1401 may establish a short range communication channel or a wired communication channel with the communication interface 1360. According to an embodiment of the present disclosure, the image collecting device 1401 may establish a BT communication channel or a WiFi direct communication channel with the communication interface 1360. The image collecting device 1401 may display a change guide in which an arrangement state of a reference guide displayed on the display is changed on the basis of guide change information provided from the image acquisition controlling device 1300. According to various embodiments, the image collecting device 1401 may be implemented as a wearable type.

The image collecting device 1402 may establish a communication channel with the image acquisition controlling device 1300 through the network 162. For example, the image collecting device 1402 may include a cellular communication module and may establish a mobile communication channel with the image acquisition controlling device 1300. Or, the image collecting device 1402 may include a WiFi communication module and may establish a mobile communication channel with the image acquisition controlling device 1300. The image collecting device 1402 may perform an operation similar or identical to an operation of the image collecting device 1401 on the basis of another type of a communication channel different from a communication channel that the image collecting device 1401 establishes in relation to a capturing composition controlling function.

According to various embodiments, the image collecting device 1401 or 1402 may obtain a reference image including at least one of a preview image or a captured image in relation to the capturing composition controlling function and may transmit the obtained reference image to the image acquisition controlling device 1300. The image collecting device 1401 or 1402 may display on the display a second reference guide (for example, a specified image displayed on a reference image in relation to a capturing composition control) corresponding to a first reference guide (for example, a specified image displayed on the image acquisition controlling device 1300 in relation to a capturing composition control) of the image acquisition controlling device 1300. According to an embodiment of the present disclosure, the image collecting device 1401 or 1402 may synchronize (for example, arrange the position, angle, and size of the first reference guide outputted from the image acquisition controlling device 1300 to be similar or identical) the second reference guide and the first reference guide. According to various embodiments of the present disclosure, the image collecting device 1401 or 1402 may display the second reference guide at a specified position on a reference image. The image collecting device 1401 or 1402 may transmit the second reference guide information in addition to the reference image to the image acquisition controlling device 1300.

According to various embodiments of the present disclosure, upon the receipt of the guide change information from the image acquisition controlling device 1300, the image collecting device 1401 or 1402 may output a second change guide where at least one of the position, rotation angle (or direction), color, and size of the second reference guide is changed on the basis of the guide change information. The second change guide, for example, may be an image or text where at least one of the position, rotation angle, and size of the second reference guide is displayed different from a previous state (for example, the second reference guide displayed with a specific position, rotation angle, and size). The second change guide may be displayed when at least one of the position, the direction (or angle), and the size is changed in correspondence to the capturing composition change of the image collecting device 1401 or 1402. According to an embodiment of the present disclosure, the image collecting device 1401 or 1402 may output guide information (for example, at least one of an indication line, an indication image, audio data relating to indication, and an indication related haptic pattern) so as to induce matching between the second change guide and the second reference guide (for example, a line or an image disposed at a specified position on the display).

According to an embodiment of the present disclosure, the image collecting device 1401 or 1402 may perform an output through a designated method (for example, highlight display, blinking display, or designated color or image display) when the second change guide and the second reference guide display are identical (for example, arranged similarly). According to an embodiment of the present disclosure, the image collecting device 1401 or 1402 may output an image or text inducing image capturing when a capturing structure is changed according to a movement of a device and the second change guide and the second reference guide are identical (or arranged similarly). According to an embodiment of the present disclosure, the image collecting device 1401 or 1402 may capture an image automatically when a time at which the second change guide and the second reference guide are identical (or arranged similarly) is more than a designated time.

When a capturing composition is changed in correspondence to a movement of a device, the image collecting device 1401 or 1402 may transmit a preview image collected in correspondence to this to the image acquisition controlling device 1300 in real-time or in a specified period. Or, the image collecting device 1401 or 1402 may transmit only information on the second change guide to the image acquisition controlling device 1300. The image collecting device 1401 or 1402 may not transmit an additional preview image and when a captured image is obtained as the second change guide and the second reference guide are identical (or arranged similarly), may transmit the obtained captured image to the image acquisition controlling device 1300.

The image acquisition controlling device 1300 and the image collecting device 1401 or 1402 may change a capturing composition of the image collecting device 1401 or 1402 on the basis of the guide change information. For example, the image acquisition controlling device 1300 may receive and output a reference image from the image collecting device 1401 or 1402 and may output a first reference guide (for example, a line or an image of the server device 1403 dividing an indication line, an indication image, an outline image, a text, a screen, which are outputted at a specified position of a screen, by each specified area). The first reference guide may be outputted according to a setting of the image acquisition controlling device 1300 or may be synchronized with the second reference guide that the image collecting device 1401 or 1402 provides.

The image acquisition controlling device 1300 may generate guide change information (or capturing composition information) corresponding to a received input (for example, a touch event touching a specified screen area or a touch event relating to a control for moving, rotating, size-changing the first reference guide on a display). In this operation, the image acquisition controlling device 1300, for example, may output to the display 1350 a first change guide in which an arrangement state of a first reference guide is changed according to the guide change information. The image acquisition controlling device 1300 may transmit the generated guide change information to at least one of the image collecting device 1401 or 1402.

According to various embodiments of the present disclosure, when a state change (for example, a movement of the image acquisition controlling device 1300 in relation to the movement, rotation, color, or size change of the first reference guide) of a device occurs in relation to the first reference guide change, the image acquisition controlling device 1300 may collect information relating to the state change as capturing composition information. For example, when a movement (for example, a movement in the back and forth, left and right, up and down, or diagonal direction or a rotation) of a device occurs in relation to a state change, the image acquisition controlling device 1300 may collect a sensor value. The image acquisition controlling device 1300 may deliver a corresponding sensor value as guide change information (or capturing composition information) to the image collecting device 1401 or 1402. According to various embodiments of the present disclosure, when an event relating to the reference guide change occurs and thus a change guide is displayed, the image acquisition controlling device 1300 may extract an image change value between the reference guide and the change guide. The image acquisition controlling device 1300 may deliver the image change value as guide change information (or capturing composition information) to the image collecting device 1401 or 1402.

The image acquisition controlling device 1300 and the image collecting device 1401 or 1402 are divided in terms of a control function and a collection function in relation to a capturing composition controlling function and each device may perform at least one of an image acquisition controlling function and an image collecting function simultaneously or separately.

Referring to FIG. 13, the image acquisition controlling device 1300 may include a bus 1310, a processor 1320 (for example, a first control unit 201 or a second control unit 301), a memory 1330 (for example, a first memory unit 209 or a second memory unit 309), an input/output interface 1340 (for example, a first display unit 205, a second display unit 305, a first input unit 207, or a second input unit 307), a display 1350 (for example, a first display unit 205 or a second display unit 305), a communication interface 1360 (for example, a first 1 RF unit 213, a second RF unit 313, a first data processing unit 215, a second data processing unit 315, a first sound processing unit 217, a second sound processing unit 317, a first short range communication unit 219, or a second short range communication unit 319), a first data processing module 1370 (for example, a first control unit 201 or a second control unit 301), a first camera module 1380 (for example, a first camera unit 203 or a second camera unit 303), and a first sensor module 1390 (for example, a first movement detection unit 211 or a second movement detection unit 311). According to various embodiments of the present disclosure, like the image acquisition controlling device 1300, the image collecting device 1401 or 1402 may include a bus, a processor, a memory, an input/output interface, a display, and a communication interface. Then, the image collecting device 1401 or 1402 may include a second data processing module, a second camera module, and a second sensor module.

The bus 1310 may be a circuit connecting the above-mentioned components to each other and delivering a communication (for example, a control message, an input event, and data) therebetween. For example, the bus 1310 may deliver an input signal inputted from the input/output interface 1340 to at least one of the processor 1320 and the first data processing module 1370. The bus 1310 may deliver a reference image received through the communication interface 1360 to at least one of the memory 1330, the display 1350, the processor 1320, or the first data processing module 1370. The bus 1310 may deliver the reference image stored in the memory 1330 to the display 1350 in correspondence to a control of the first data processing module 1370. The bus 1310 may deliver reference guide information that the image collecting device 1401 or 1402 provides to the first data processing module 1370. According to an embodiment of the present disclosure, the bus 1310 may receive an event corresponding to guide change information for changing the first reference guide from the input/output interface 1340 or the display 1350 and may then deliver the received event to the first data processing module 1370. The bus 1310 may deliver an obtained image or a group image, which are received from the image collecting device 1401 or 1402, to at least one of the memory 1330, the first data processing module 1370, and the display 1350.

The processor 1320, for example, receives an instruction from the above other components (for example, the memory 1330, the input/output interface 1340, the display 1350, the communication interface 1360, or the first data processing module 1370) through the bus 1310, interprets the received instruction, and performs operations and data processing in response to the interpreted instruction. The processor 1320 may be implemented in a form including the first data processing module 1370 or may be implemented separated from the first data processing module 1370, or may be implemented in a form for performing communication on the basis of the bus 1310 or directly.

The memory 1330 may store an instruction or data received from the processor 1320 or other components (for example, the input/output interface 1340, the display 1350, the communication interface 1360, or the first data processing module 1370) or an instruction or data generated from the processor 1320 or other components. The memory 1330, for example, may include programming modules, for example, a kernel 1131, a middleware 1132, an Application Programming Interface (API) 1133, and an application 1134. Each of the above-mentioned programming modules may be configured with software, firmware, hardware, or a combination thereof.

The kernel 1131 may control or manage system resources (for example, the bus 1310, the processor 1320, or the memory 1330) used for performing operations or functions implemented by the remaining other programming modules, for example, the middleware 1132, the API 1133, or the application 1134. In an embodiment, the kernel 1131 may provide an interface for accessing an individual component of the image acquisition controlling device 1300 from the middleware 1132, the API 1133, or the application 1134 and controlling or managing the individual component.

The middleware 1132 may serve as an intermediary role for exchanging data between the API 1133 or the application 1134 and the kernel 1131 through communication. In an embodiment, in relation to job requests received from the applications 1134, the middleware 1132 may perform a control (for example, scheduling or load balancing) for the job requests by using a method of assigning a priority for using a system resource (for example, the bus 1310, the processor 1320, or the memory 1330) of the image acquisition controlling device 1300 to at least one application among the applications 1134.

The API 1133, as an interface through which the application 1134 controls a function provided from the kernel 1131 or the middleware 1132, may include at least one interface or function (for example, an instruction) for file control, window control, image processing, or character control.

According to various embodiments, the application 1134 may include an Short Message Service (SMS)/Multimedia Message Service (MMS) application, an e-mail application, a calendar application, an alarm application, a health care application (for example, an application for measuring an exercise amount or blood sugar), or an environmental information application (for example, an application for providing pressure, moisture, or temperature information). Additionally or alternatively, the application 1134 may be an application relating to information exchange between the image acquisition controlling device 1300 and an external electronic device (for example, the image collecting device 1401 or 1402). The application relating to information exchange, for example, may include a notification relay application for delivering specific information to the external electronic device or a device management application for managing the external electronic device.

For example, the notification relay application may have a function for delivering to an external electronic device (for example, the image collecting device 1401 or 1402) notification information occurring from another application (for example, an SMS/MMS application, an e-mail application, a health care application, or an environmental information application) of the image acquisition controlling device 1300. Additionally or alternatively, the notification relay application 1134 may receive notification information from an external electronic device (for example, the image collecting device 1401 or 1402) and may then provide the received notification information to a user. The device management application, for example, may manage (for example, install, delete, or update) a function (for example, turning on/off an external electronic device itself (or some components) or adjusting the brightness (or resolution) of a display) for at least part of an external electronic device (for example, the image collecting device 1401 or 1402) communicating with the image acquisition controlling device 1300, an application operating in the external electronic device, or a service (for example, a call service or a message service) provided from the external electronic device.

According to various embodiments of the present disclosure, when an external electronic device is a digital audio player, the application 1134 may include an application relating to music playback. Similarly, when an external electronic device is a mobile medical device, the application 1134 may include an application relating to heath care. According to an embodiment of the present disclosure, the application 1134 may include an application relating to a capturing composition controlling function of the image acquisition controlling device 1300.

According to various embodiments of the present, the memory 1330 may store at least one of a reference image, an obtained image, and a group image. The memory 1330 may store first reference guide information. According to various embodiments of the present disclosure, a memory in an image collecting device may store at least one of a reference image, an obtained image, and a group image, and second reference guide information. In an embodiment, the memory 1330 may store guide change information temporarily. The guide change information may include at least one of a touch event relating to reference guide change, a sensor value, and an image change value.

The input/output interface 1340 may deliver an instruction or data inputted from a user through an input/output device (for example, a sensor, a keyboard, or a touch screen), to the processor 1320, the memory 1330, the communication interface 1360, or the first data processing module 1370 through the bus 1310. For example, the input/output interface 1340 may provide an event (for example, a touch event relating to reference guide change) for a touch inputted through a touch screen, to the processor 1320. In an embodiment, the input/output interface 1340 may output an instruction or data received from the processor 1320, the memory 1330, the communication interface 1360, or the first data processing module 1370 through the bus 1310, through the input/output device (for example, a speaker or a display). According to various embodiments, the input/output interface 1340 may include a physical button (for example, a home key, a side key, and a power key), a jog key, and a keypad. The input/output interface 1340 may include a virtual keypad outputted on the display 1350 as an input device.

According to various embodiments of the present disclosure, the input/output interface 1340 may perform a function relating to audio processing. In relation to this, the input/output interface 1340 may include at least one of a speaker and a microphone (mic) singularly or plurally. The input/output interface 1340, for example, may output audio data relating to a screen outputted to the display 1350 through a speaker according to a control of the first data processing module 1370. The audio data output of the input/output interface 1340 may be omitted in correspondence to a user setting or whether the image acquisition controlling device 1300 supports the audio data output.

The display 1350 may display various information (for example, multimedia data or text data). For example, the display 1350 may output a lock screen and a standby screen. The display 1350 may output a specific function execution screen, for example, a sound playback application execution screen, a video playback application execution screen, and a broadcast reception screen, in correspondence to function execution. According to an embodiment of the present disclosure, the display 1350 may output a reference image received from the image collecting device 1401 or 1402. Here, the reference image may be corresponding captured image (for example, a still image) when the image collecting device 1401 or 1402 outputs a captured image. Or, the reference image may be corresponding preview image when the image collecting device 1401 or 1402 outputs a preview image in real time.

The display 1350 may output a first reference guide (i.e., a reference guide generated based on reference guide that the image acquisition controlling device 1300 provides or reference guide information that the image collecting device 1401 or 1402 provides) on an image where a reference image is outputted. The display 1350 may output a first change guide where at least one of the position, direction (or angle), color, and size of the first reference guide is changed in correspondence to a touch event or a movement of a device. The display 1350 may output an obtained image that the image collecting device 1401 or 1402 provides after transmitting guide change information. In an embodiment, the display 1350 may output a group image corresponding to a matrix guide. According to an embodiment of the present disclosure, the image collecting device 1401 or 1402 includes a display and may output at least one of a reference image, a second reference guide (for example, an image synchronized with the first reference guide), a second change guide (for example, an image where an arrangement state of the second reference guide is changed), an obtained image, and a group image.

The communication interface 1360 may connect a communication between the image acquisition controlling device 1300 and an external device (for example, at least one of the image collecting device 1401 or 1402 and the server device 1430). For example, the communication interface 1360 may communicate with the external device in connection to the network 162 through wireless communication or wired communication. The wireless communication may include at least one of Wireless Fidelity (WiFi), Bluetooth (BT), Near Field Communication (NFC), Global Positioning System (GPS), or Cellular Communication (for example, LTE, LTE-A, CDMA, WCDMA, UMTS, WiBro, or GSM). The wired communication may include at least one of Universal Serial Bus (USB), High Definition Multimedia Interface (HDMI), Recommended Standard 232 (RS-232), or Plain Old Telephone Service (POTS), for example.

According to an embodiment of the present disclosure, the network 162 may be telecommunications network. The telecommunications network may include at least one of computer network, internet, internet of things, or telephone network. According to an embodiment of the present disclosure, a protocol (for example, transport layer protocol, data link layer protocol, or physical layer protocol) for communication between the image acquisition controlling device 1300 and an external device may be supported by at least one of the application 1134, the application programming interface 133, the middleware 1132, the kernel 1131, or the communication interface 1360.

The communication interface 1360 may include a plurality of communication modules when the image acquisition controlling device 1300 supports a plurality of communication methods. For example, the image acquisition controlling device 1300 may include a communication module for establishing a direct communication channel with the image collecting device 1401, for example, a short range communication module or a direct communication module. The short range communication module or the direct communication module may include at least one of various communication modules, for example, a WiFi-direct communication module, a BT communication module, and a ZigBee communication module. In an embodiment, the direct communication module may include a wired communication module such as cable.

According to an embodiment of the present disclosure, the communication interface 1360 may transmit/receive data relating to a capturing composition controlling function to/from at least one of the image collecting device 1401 or 1402. The communication interface 1360 may deliver at least one of a received reference image, reference guide information, an obtained image, and a group image to the first data processing module 1370. The communication interface 1360 may transmit guide change information relating to a reference guide change to the image collecting device 1401 or 1402 or the server device 1403 in correspondence to a control of the first data processing module 1370.

The first camera module 1380 (for example, the first camera unit 203 or the second camera unit 303) may collect an image. According to various embodiments of the present disclosure, the image acquisition controlling device 1300 may not include the first camera module 1380. However, when the image acquisition controlling device 1300 operates as the image collecting device 1401 or 1402, the first camera module 1380 may collect at least one of a reference image, an obtained image, and a group image according to a control of an external electronic device.

The first sensor module 1390 may collect a sensor value relating to a movement of the image acquisition controlling device 1300. For example, the first sensor module 1390 includes an acceleration sensor and may collect information on a specified distance moving in at least one direction of the back and forth, left and right, up and down, and diagonal directions of the image acquisition controlling device 1300. A sensor value that the first sensor module 1390 collects may be provided as guide change information (or capturing composition information) to the image collecting device 1401 or 1402.

The first data processing module 1370 may process at least part of information obtained from other components (for example, the processor 1320, the memory 1330, the input/output interface 1340, or the communication interface 1360) and may output it through various methods. For example, the first data processing module 1370 may perform a control to establish a communication channel with the image collecting device 1401 or 1402 in relation to a capturing composition controlling function. Here, the first data processing module 1370 may operate a communication channel (for example, a fixed channel for data transmission in relation to capturing composition control) fixed pre-assigned in relation to a capturing composition controlling function described in various embodiments or may operate a communication channel (for example, a dynamic channel established temporarily in relation to data transmission or reception and returned when a corresponding task is completed) formed temporarily in a data transmission or reception situation of data relating to capturing composition controlling function management.

According to various embodiments of the present disclosure, at least one of the image collecting device 1401 or 1402 includes a second data processing module and may support processing of a control signal or processing of data relating to a capturing composition controlling function. The image collecting device 1401 or 1402 may include similar configurations to the image acquisition controlling device 1300 as mentioned above.

Figure 14:
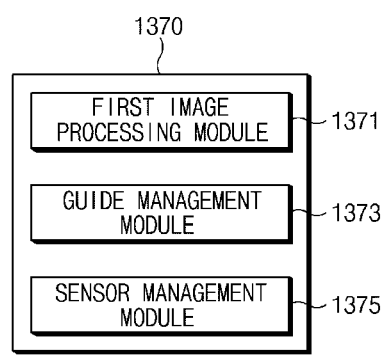
FIG. 14 is a configuration diagram of a first data processing module of an image acquisition controlling device according to an embodiment of the present disclosure.

FIG. 14 is a configuration diagram of a first data processing module of an image acquisition controlling device according to an embodiment of the present disclosure.

Referring to FIG. 14, the first data processing module 1370 may include a first image processing module 1371, a guide management module 1373, and a sensor management module 1375.

The first image processing module 1371 may perform processing of at least one of a reference image, a first reference guide, a first change guide, an obtained image, or a group image. For example, when there is a setting relating to a capturing composition controlling function or an event (for example, a communication channel establishment request event relating to a capturing composition controlling function from the selection of an icon or menu allocated in relation to a capturing composition controlling function or the image collecting device 1401 or 1402) relating to capturing composition controlling function execution occurs, the first image processing module 1371 may establish a communication channel with the image collecting device 1401 or 1402. When a reference image is received from the image collecting device 1401 or 1402, the first image processing module 1371 may store the reference image in the memory 1330 temporarily or output the reference image to the display 1350. When the reference image is a continuous preview image, the first image processing module 1371 may control the continuous preview image to be outputted in real time. When the image collecting device 1401 or 1402 transmits a preview image in a specified period, the first image processing module 1371 may control the received preview image to be outputted to the display 1350 in the specified period. When receiving a captured image as a reference image, the first image processing module 1371 may control the captured image (for example, a still image) to be outputted to the display 1350. The first image processing module 1371 may request the guide management module 1373 to output a reference guide on the display 1350 where a reference image is displayed.

According to various embodiments of the present disclosure, the first image processing module 1371 may control a matrix guide to be outputted to the display 1350 according to a setting or in correspondence to menu selection. The image processing module 1371 may arrange a reference image in a partial area (for example, the center area of the matrix guide) in the matrix guide. In this operation, the first image processing module 1371 may adjust (for example, reduce or extend) the size of a reference image and arrange it. Once a group image corresponding to the matrix guide is received, the first image processing module 1371 may control the group image to be outputted to the display 1350. In this operation, the matrix guide may be disposed on the group image (for example, an upper layer). When a specific point of the group image is selected, the first image processing module 1371 may control an image at the selected point to be outputted in full screen. The first image processing module 1371 may adjust an arrangement state of a group image according to a drag event.

The guide management module 1373 may control a first reference guide to be outputted to the display 1350. For example, when a reference image is displayed on the display 1350 or an event relating to a capturing composition controlling function occurs or a communication channel is established with the image collecting device 1401 or 1402, the guide management module 1373 may control a first reference guide to be outputted to the display 1350. The guide management module 1373 may control the first reference stored in the memory 1330 to be outputted to a specified position of the display 1350. For example, the guide management module 1373 may arrange the first reference guide to allow a specified point (for example, the center point) of the first reference guide to be identical (or arranged similar) to a specified position (for example, the center point) of the display 1350.

The guide management module 1373 may receive an input event (for example, a touch event) from the display 1350 or the input/output interface 1340. The guide management module 1373 may change a first reference guide position in the display 1350 according to an input event. For example, when a touch event (for example, a tap event) occurs at a specified point of the display 1350, the guide management module 1373 may control a first change guide (for example, a guide changed to allow the center point of the first reference guide to be related (for example, correspond) to a touch point) to be outputted. Or, when a drag event occurs, the guide management module 1373 may control a first change guide (for example, a guide moving the first reference guide to correspond to the drag event) to be outputted. Or, when a directional touch event (for example, a drag event drawing an arc) having a specific direction occurs, the guide management module 1373 may control a first change guide (for example, a guide obtained by rotating the first reference guide or changing its angle according to the directional touch event) to be outputted. Or, when a scaling touch event (for example, a pinch zoom-in, pinch zoom-out, or multi-touch movement event) relating to size adjustment occurs, the guide management module 1373 may control a first change guide (for example, a guide obtained by adjusting the size of a first reference guide according to a first reference guide) to be outputted.

According to various embodiments of the present disclosure, the guide management module 1373 may receive a sensor value from the sensor management module 1375. The guide management module 1373 may extract at least one of the position, direction (or angle), or size of a first reference guide in correspondence to a sensor value and may generate guide change information on the basis of the extracted value. The guide management module 1373 may transmit guide change information (for example, a sensor value) to the image collecting device 1401 or 1402.

According to various embodiments of the present disclosure, the guide management module 1373 may control an output of a first change guide where at least one of the position, direction, or size of the first reference guide is changed in correspondence to a sensor value. For example, when the image acquisition controlling device 1300 rotates by a specified angle on the basis of a specified axis (for example, a vertical axis parallel to an upright user), the guide management module 1373 may control a first change guide obtained by rotating the first reference guide by a corresponding angle to be outputted. When the image acquisition controlling device 1300 moves in a vertical direction on the basis of the ground, the guide management module 1373 may control a first change guide obtained by moving the first reference guide by a corresponding distance to be outputted.

According to various embodiments of the present disclosure, the guide management module 1373 may extract an image change value between a first reference guide and a first change guide. The guide management module 1373 may transmit the image change value as guide change information to the image collecting device 1401 or 1402.

According to various embodiments of the present disclosure, the guide management module 1373 may receive an adjustment value (for example, a value obtained by adjusting at last one of the position, size, direction (or angle), or color of a reference guide according to a movement of the image collecting device 1401 or 1402) corresponding to guide change information from the image collecting device 1401 or 1402. The guide management module 1373 may adjust a first change guide in correspondence to the adjustment value corresponding to the guide change information. The first change guide of the image acquisition controlling device 1300 may be synchronized with the second change guide of the image collecting device 1401 or 1402. When the first change guide and the first reference guide are identical (or arranged similarly), the guide management module 1373 may output a notification (for example, at least one of an image, a text, audio data, or haptic) for that. In an embodiment, the guide management module 1373 may output information (for example, a capturing icon) relating to capturing induction. When an event (for example, a capturing icon selection event) relating to capturing indication occurs, the guide management module 1373 may transmit the event to the image collecting device 1401 or 1402. Correspondingly, the image collecting device 1401 or 1402 may capture an image for a subject in a corresponding capturing composition.

The guide management module 1373 may control a matrix guide to be displayed on the display 1350 in correspondence to a menu selection. After the matrix guide is displayed and then a touch event (for example, an event for selecting a specified point of the matrix guide) is received, the guide management module 1373 may transmit the event to the image collecting device 1401 or 1402.

The sensor management module 1375 may control at least one of the activation of the first sensor module 1390 or the collection of a sensor value. For example, when the first reference guide is outputted on the display 1350, the sensor management module 1375 may activate the first sensor module 1390. The sensor management module 1375 may collect a sensor value generated according to a movement of the image acquisition controlling device 1300. The sensor management module 1375 may provide the collected sensor value to the guide management module 1373.

According to an embodiment of the present disclosure, the sensor management module 1375 may activate the first sensor module 1390 for a specified time (or predetermined time) and may then deactivate the first sensor module 1390 after collecting a sensor value. For example, when the first reference guide is outputted on the display 1350, the sensor management module 1375 may collect a sensor value for a specified time. After the specified time elapses, the sensor management module 1375 may provide the collected sensor value to the guide management module 1373 and may deactivate the first sensor module 1390. According to various embodiments of the present disclosure, when a designated touch event (for example, an event relating to guide change information generation) occurs on the display 1350, the sensor management module 1375 may deactivate the first sensor module 1390.

As mentioned above, according to various embodiments of the present disclosure, an electronic device (for example, an image acquisition controlling device) may include a communication interface for receiving a reference image and a data processing module for displaying a change guide corresponding to a capturing composition change relating to the reference image in correspondence to event occurrence.

According to various embodiments of the present disclosure, the data processing module may display a designated reference guide in relation to the reference image.

According to various embodiments of the present disclosure, the data processing module may display the change guide where an arrangement state of the reference guide is changed in correspondence to the event occurrence.

According to various embodiments of the present disclosure, the data processing module may display the change guide where at least one of the position, direction, size, or color or the reference guide is adjusted in correspondence to a type of a touch event.

According to various embodiments of the present disclosure, the data processing module may display the change guide where an arrangement state of the reference guide is adjusted in correspondence to a sensor value relating to the device movement.

According to various embodiments of the present disclosure, the data processing module may transmit guide change information including at least one of arrangement state information of the change guide and a difference value between the reference guide and the change guide, to a device collecting the reference image.

According to various embodiments of the present disclosure, the data processing module may divide a display area of the display and may then output a change guide in a matrix where the reference image is disposed, to at least one area.

According to various embodiments of the present disclosure, the data processing module may output the matrix guide smaller than the entire display area to a specified area (or a predetermined area) of the display.

According to various embodiments of the present disclosure, the data processing module may output the matrix guide having a specified transparency or a matrix mini guide smaller than the entire display area to a specified area of the display.

According to various embodiments of the present disclosure, the data processing module may transmit information on areas selected in correspondence to the event from a change guide in the matrix to a device collecting the reference image and when an image for the selected areas is received, may arrange a corresponding received image in each selected area of the change guide in the matrix.

According to various embodiments of the present disclosure, the data processing module may display a selected area from the change guide area in the matrix in full screen in correspondence to designated event occurrence.

According to various embodiments of the present disclosure, the data processing module may adjust at least one of the number of divided areas of the change guide in the matrix and the arrangement position of the reference image in correspondence to designated event occurrence.

Figure 15:
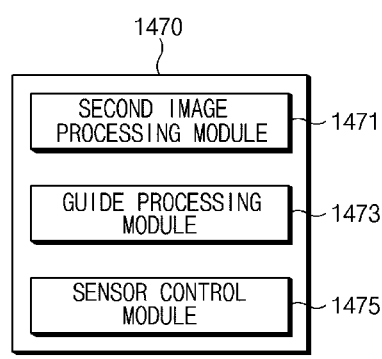
FIG. 15 is a configuration diagram of a second data processing module of an image collecting device according to an embodiment of the present disclosure.

FIG. 15 is a configuration diagram of a second data processing module of an image acquisition controlling device according to an embodiment of the present disclosure.

Referring to FIG. 15, the second data processing module 1470 may include a second image processing module 1471, a guide management module 1473, and a sensor control module 1475.

The second image processing module 1471 may control image processing of an image collecting device 1400 (for example, the image collecting device 1401 or 1402). For example, when an event relating to capturing composition controlling function activation occurs, the second image processing module 1471 may activate a camera module functionally connected to the image connecting device 1400. The second image processing module 1471 may transmit a reference image including at least one of a preview image or a captured image that a camera module collects to the image acquisition controlling device 1300. In relation to this, the second image processing module 1471 may perform a control to establish a communication channel with the image acquisition controlling device 1300. The second image processing module 1471 may output a reference image to a display. In this operation, the second image processing module 1471 may request the guide processing module 1473 to output a second reference guide. According to an embodiment of the present disclosure, the second image processing module 1471 may transmit a captured image to the image acquisition controlling device 1300 according to whether a second change guide and a second reference guide are identical (or arranged similarly).

According to various embodiments, when a matrix guide is received, the second image processing module 1471 may change an image that a camera module collects to correspond to the matrix guide. For example, the second image processing module 1471 may adjust the size of an image (for example, a preview image or a captured image) that a camera module collects and then arrange it in a specified area of the matrix guide. The second image processing module 1471 may arrange an additionally captured image to correspond to the matrix guide according to a control of the guide processing module 1473.

The guide processing module 1473 may control at least one output of a second reference guide, a second change guide, and a matrix guide and information display corresponding thereto. Information relating to a second reference guide may be pre-stored in a memory and managed or may be generated when a reference image is outputted to a display. The guide processing module 1473 may arrange the second reference guide on a reference image (for example, an upper layer). When transmitting the reference image to the image acquisition controlling device 1300, the guide processing module 1473 may transmit the second reference guide information at the same time.

According to various embodiments of the present disclosure, the guide processing module 1473 may receive guide change information from the image acquisition controlling device 1300. The guide processing module 1473 may output a second change guide where at least one of the position, direction (or angle), color, and size of the second reference guide is changed on the basis of the received guide change information. After outputting the second change guide, the guide processing module 1473 may output a designated message (for example, a message (for example, at least one of an image, a text, haptic (vibration), audio data) inducing the second change guide to be identical (or arranged similar) to the second reference guide).

According to various embodiments of the present disclosure, when a capturing composition is changed according to a movement of the image collecting device 1400, according thereto, the guide processing module 1473 may change at least one of the position, size, color, or direction of the second change guide. For example, when the guide change information is received, the guide processing module 1473 may activate the second sensor module and may then collect a sensor value in correspondence to movement occurrence of the image collecting device 1400. The guide processing module 1473 may change a display format of the second change guide on the basis of the collected sensor value. For example, when the image collecting device 1400 moves to the left direction by a specified distance, the guide processing module 1473 may move the second change guide to the right direction by a specified distance on a display and may then display it. Or, when the image collecting device 1400 rotates to a specified direction by a specified angle, the guide processing module 1473 may adjust a direction (or an angle) of the second change guide on a display.

According to various embodiments of the present disclosure, when the second change guide and the second reference guide are arranged identically or similarly, the guide processing module 1473 may output a notification (for example, at least one of a blinking effect in at least a partial area of the display, haptic notification, and audio data output for identical or similar arrangement). In an embodiment, when the second change guide and the second reference guide are arranged identically or similarly, the guide processing module 1473 may output a message (for example, at least one of an image, a text, or audio data) through a display or an input/output interface. According to an embodiment of the present disclosure, when the second change guide and the second reference guide are arranged identically, the guide processing module 1473 may capture an image automatically. According to various embodiments of the present disclosure, when the second change guide is outputted, the guide processing module 1473 may process the second reference guide to have a specified transparency. Or, when the second change guide is outputted, the guide processing module 1473 may process the second reference guide to be invisible temporarily.

According to various embodiments of the present disclosure, the guide processing module 1473 may output only the second change guide without outputting the second reference guide. For example, the guide processing module 1473 may output the second change guide positioned at a specified point of the display to the center point. The guide processing module 1473 may adjust the second change guide on the display in correspondence to a movement change of the image collecting device 1400. When the second change guide has a designated specific arrangement state (for example, an arrangement state corresponding to guide change information), the guide processing module 1473 may output a notification for that or may control automatic capturing.

According to various embodiments of the present disclosure, the guide processing module 1473 may synchronize the second change guide with the first change guide of the image acquisition controlling device 1300. In relation to this, the guide processing module 1473 may collects a sensor value for a movement change of the image collecting device 1400 and may then transmit it to the image acquisition controlling device 1300. Or, the guide processing module 1473 may extract an adjustment value of the second change guide in correspondence to a sensor value and may then transmit it to the image acquisition controlling device 1300 in real time or in a specified period. When the second change guide and the second reference guide are arranged identically or similarly or have a designated arrangement state (for example, an arrangement state corresponding to guide change information), the first change guide of the synchronized image acquisition controlling device 1300 may be arranged identical or similar to the first reference guide.

The guide processing module 1473 may receive matrix guide information (information requesting the image collecting device 1400 to output an image relating to the matrix guide or a designated matrix guide) from the image acquisition controlling device 1300. The guide processing module 1473 may output the matrix guide to the display. According to an embodiment of the present disclosure, the matrix guide of the image collecting device 1400 may be synchronized with the matrix guide of the image acquisition controlling device 1300. The guide processing module 1473 may output a message (for example, information inducing a movement of the image collecting device 1400 to have a specific capturing composition) to capture an image in a capturing composition relating to a point designated in the matrix guide. When a preview image relating to a point designated in the matrix guide is obtained, the guide processing module 1473 may output a notification for that. Or, when a preview image relating to a point designated in the matrix guide is obtained, the guide processing module 1473 may capture an image automatically. When an image of points designated in the matrix guide are captured, the guide processing module 1473 may generate a group image. The guide processing module 1473 may transmit the group image to the image acquisition controlling device 1300. According to various embodiments of the present disclosure, the guide processing module 1473 may transmit a preview image or a captured image, which are obtained each time an image of points designated in the matrix guide, to the image acquisition controlling device 1300.

When a capturing composition controlling function is executed or guide change information is received from the image acquisition controlling device 1300 or a user input occurs, the sensor control module 1475 may be activated in correspondence to one of them. The sensor control module 1475 may collect a sensor value in correspondence to a movement generation of the image collecting device 1400. The sensor control module 1475 may provide the collected sensor value to the guide processing module 1473.

As mentioned above, according to various embodiments of the present disclosure, an electronic device (for example, an image collecting device) may include a camera module for collecting a reference image, a communication interface for transmitting the reference image, and a data processing module for receiving guide change information guiding a capturing composition change relating to the reference image and displaying a change guide corresponding to the guide change information.

According to various embodiments of the present disclosure, the data processing module may display a message inducing an identical or similar arrangement of a designated reference guide and the change guide or a designated arrangement.

According to various embodiments of the present disclosure, the data processing module may adjust an arrangement state of the change guide on the basis of the collected sensor value in correspondence to the device movement.

According to various embodiments of the present disclosure, when the change guide and the designated reference guide having an identical or similar arrangement or a designated arrangement, the data processing module may output a message inducing image capturing.

According to various embodiments of the present disclosure, when the change guide and the designated reference guide having an identical or similar arrangement or a designated arrangement, the data processing module may capture an image automatically.

According to various embodiments of the present disclosure, the data processing module may transmit the captured obtained image to a device providing the guide change information.

According to various embodiments of the present disclosure, the data processing module may display a matrix guide where the reference image is arranged in a specified area where a display area of a display is divided in correspondence to the guide change information.

According to various embodiments of the present disclosure, the data processing module may display a guide message inducing a device movement to capture an image corresponding to selected areas from specified areas of the matrix guide.

According to various embodiments of the present disclosure, when a subject corresponding to the selected areas enters a capturing composition, the data processing module may capture an image automatically.

According to various embodiments of the present disclosure, the data processing module may transmit the group image captured in correspondence to the selected areas to a device providing the guide change information.

Figure 16:
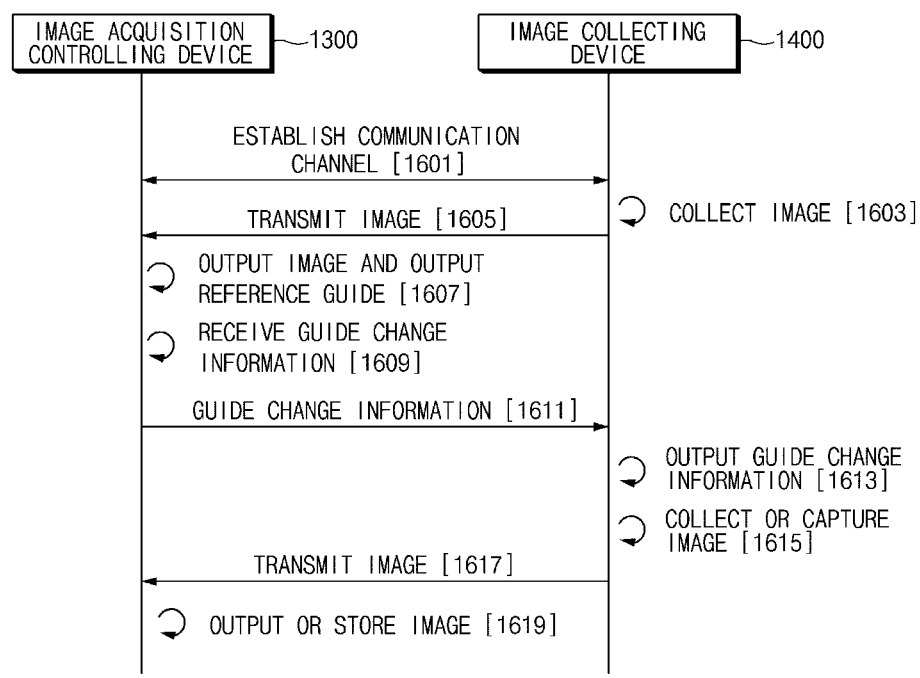
FIG. 16 is a signal flowchart between components of an image management system according to an embodiment of the present disclosure.

FIG. 16 is a signal flowchart between components of an image management system according to an embodiment of the present disclosure.

Referring to FIG. 16, the image acquisition controlling device 1300 and the image collecting device 1400 (for example, the image collecting device 1401 or 1402) may establish a communication channel in operation 1601.

In operation 1603, the image collecting device 1400 may collect an image by activating a camera module. For example, the image collecting device 1400 may collect a reference image including at least one of a preview image or a captured image. In this operation, the image collecting device 1400 may output the collected reference image to a display. In an embodiment, the image collecting device 1400 may output a reference guide on a reference image. According to various embodiments of the present disclosure, the image collecting device 1400 may establish a communication channel with the image acquisition controlling device 1300 after capturing a reference image by using a camera module.

In operation 1605, the image collecting device 1400 may transmit the collected reference image to the image acquisition controlling device 1300. In this operation, when a preview image is provided as a reference image, the image collecting device 1400 may transmit a preview image obtained in real time or in a specified period to the image acquisition controlling device 1300.

In operation 1607, the image acquisition controlling device 1300 may output at least one of a received image (for example, a reference image) or a first reference guide to the display 1350. According to an embodiment of the present disclosure, the first reference guide outputted to the image acquisition controlling device 1300 may be synchronized with the second reference guide displayed on the image collecting device 1400 in terms of a display format.

In operation 1609, the image acquisition controlling device 1300 may collect an event relating to at least one change of the position, size, direction (or angle), and color of the first reference guide. For example, the image acquisition controlling device 1300 may receive a touch event adjusting an arrangement state of the first reference guide on the display 1350 wherein the first reference guide is displayed. Or, the image acquisition controlling device 1300 may receive sensor value relating to a movement change of a device. According to an embodiment of the present disclosure, the image acquisition controlling device 1300 may output a first change guide where an arrangement state of the first reference guide is adjusted on the basis of at least one of an obtained touch event or sensor value. The image acquisition controlling device 1300 may collect guide change information corresponding to at least one of the obtained touch event or sensor value and a difference value between the first reference guide and the first change guide.

In operation 1611, the image acquisition controlling device 1300 may transmit the guide change information to the image collecting device 1400. In operation 1613, the image collecting device 1400 may output the received guide change information. In this operation, the image collecting device 1400 may output a second change guide where at least one of the position, direction (or angle), size, or color of the second reference guide is changed on the basis of the guide change information. According to an embodiment of the present disclosure, the second change guide outputted to the image collecting device 1400 may be synchronized with the first change guide displayed on the image acquisition controlling device 1300.

The second change guide may be changed in correspondence to a movement of the image collecting device 1400. For example, when a device moves by a specified distance in at least one of the back and forth, left and right, up and down, and diagonal directions of the image collecting device 1400, the second change guide may move on the display in correspondence thereto and may then be displayed. Accordingly, a capturing composition of an image that a camera module of the image collecting device 1400 collects may be changed.

In operation 1615, when a movement of a device occurs so as to allow the second change guide and the second reference guide to be arranged identically or similarly, the image collecting device 1400 may perform image collection or capturing automatically or according to a control of the image acquisition controlling device 1300 or in correspondence to a user input. In operation 1617, the image collecting device 1400 may transmit the collected obtained image (for example, at least one of a preview image or a captured image) to the image acquisition controlling device 1300. In operation 1619, the image acquisition controlling device 1300 may output the received obtained image to the display 1350 or may store it in the memory 1330.

As mentioned above, the first change guide may be synchronized with the second change guide. Or, an image that the camera module of the image collecting device 1400 collects may be transmitted to the image acquisition controlling device 1300 and then be synchronized in real time. Accordingly, when an arrangement state of the image collecting device 1400 is changed and thus capturing composition information is changed, the image acquisition controlling device 1300 may output an image where a capturing structure of the image collecting device 1400 is changed.

As mentioned above, according to various embodiments of the present disclosure, an electronic device operating method (for example, an operating method of an image acquisition controlling device) may include an operation for receiving a reference image and an operation for displaying a change guide corresponding to a capturing composition change relating to the reference image in correspondence to event occurrence.

According to various embodiments of the present disclosure, the method may further include an operation for displaying a reference guide designated in relation to the reference image.

According to various embodiments of the present disclosure, the displaying operation may include an operation for displaying the change guide where an arrangement state of the reference guide is changed in correspondence to the event occurrence.

According to various embodiments of the present disclosure, the displaying operation may include an operation for displaying the change guide where at least one of the position, direction, size, or color or the reference guide is adjusted in correspondence to a type of a touch event.

According to various embodiments of the present disclosure, the displaying operation may include an operation for displaying the change guide where an arrangement state of the reference guide is adjusted in correspondence to a sensor value relating to the device movement.

According to various embodiments of the present disclosure, the method may include an operation for transmitting guide change information including at least one of arrangement state information of the change guide and a difference value between the reference guide and the change guide, to a device collecting the reference image According to various embodiments of the present disclosure, the method may include an operation for dividing a display area of the display and displaying a change guide in a matrix where the reference image is disposed, to at least one area.

According to various embodiments of the present disclosure, the method may include an operation for transmitting information on areas selected in correspondence to the event from a change guide in the matrix to a device collecting the reference image and an operation for, when an image for the selected areas is received, arranging a corresponding received image in each selected area of the change guide in the matrix.

According to various embodiments of the present disclosure, the method may include an operation for displaying a selected area from the change guide area in the matrix in full screen in correspondence to designated event occurrence.

According to various embodiments of the present disclosure, the method may include an operation for adjusting at least one of the number of divided areas of the change guide in the matrix and the arrangement position of the reference image in correspondence to designated event occurrence.

Figure 17:
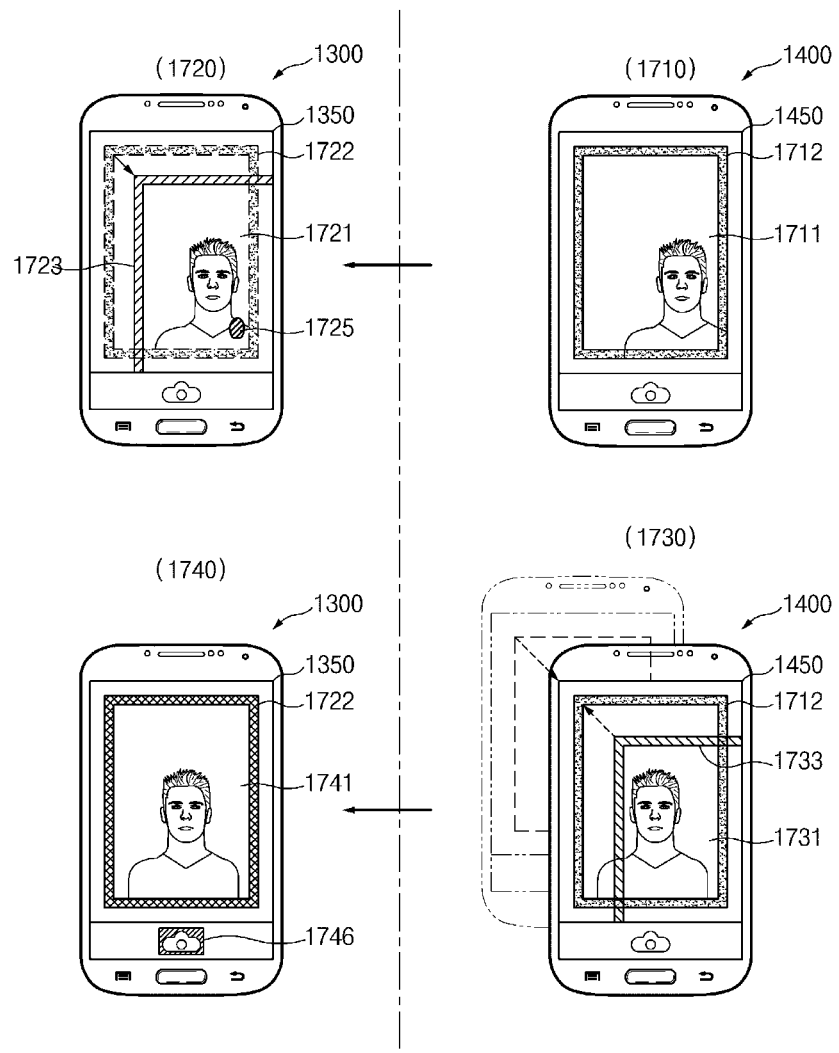
FIG. 17 is a view illustrating a screen view relating to guide management according to an embodiment of the present disclosure.

FIG. 17 is a view illustrating a screen view relating to guide management according to an embodiment of the present disclosure.

Referring to FIG. 17, when a camera module activation event or an event relating to a capturing composition controlling function occurs, the image collecting device 1400 (for example, the image collecting device 1401 or 1402) may activate a camera module. The image collecting device 1400 may output a reference image 1711 including at least one of a preview image or a captured image, which are collected based on an activated camera module, as shown in the state 1710. In this operation, the image collecting device 1400 may output the reference guide 1712 to the display 1450. For example, the reference guide 1712 may be a rectangular strip image where its center point is arranged identical or similar to the center point of the display 1450. The reference guide 1712 in a rectangular strip image form may be arranged in the edge area of the display 1450.

When the reference image 1711 is collected, the image collecting device 1400 may deliver the collected reference image 1711 to the image acquisition controlling device 1300. In relation to this, the image collecting device 1400 may temporarily establish a communication channel relating to the transmission of the reference image 1711 with the image acquisition controlling device 1300 or may establish a fixe channel. The image collecting device 1400 may transmit information relating to the reference guide 1712 together with the reference image 1711 to the image acquisition controlling device 1300. In relation to the delivery of the reference image 1711, the image collecting device 1400 may receive an identification number (for example, a phone number) for establishing a communication channel with the image acquisition controlling device 1300.

In the state 1720, the image acquisition controlling device 1300 may establish a communication channel with the image collecting device 1400 in relation to a capturing composition controlling function and may receive the reference image 1711 from the image collecting device 1400. Additionally or alternatively, the image acquisition controlling device 1300 may receive information relating to the reference guide 1712. The image acquisition controlling device 1300 may output the received reference image 1711 from the image collecting device 1400 in a specified area of the display 1350. According to various embodiments of the present disclosure, the received reference image 1721 may be synchronized with the reference image 1711 provided from the image collecting device 1400.

According to an embodiment of the present disclosure, the image acquisition controlling device 1300 may output the reference guide 1722 to a specified area. For example, the image acquisition controlling device 1300 may arrange the reference guide 1722 in a strip form in the edge of the display 1350. According to various embodiments of the present disclosure, the reference guide 1722 may be synchronized with the reference guide 1712 and arranged.

When an event 1725 (for example, a touch event for selecting a specified point of the display 1350) occurs, the image acquisition controlling device 1300 may collect the corresponding event 1725 as guide change information. For example, when a touch event for selecting a specified lower right point of the display 1350 is received, the image acquisition controlling device 1300 may generate guide change information for requesting the center point of a reference guide to be disposed at a touch point. According to various embodiments of the present disclosure, the image acquisition controlling device 1300 may output a change guide where at least one of the position, direction (or angle), size, or color of the reference guide 1722 is changed in correspondence to the occurred event 1725. The image acquisition controlling device 1300 may generate guide information including at least one of the position, direction (or angle), size, or color of the change guide 1723 and may then transmit it to the image collecting device 1400.

In the state 1730, the image collecting device 1400 may receive guide change information from the image acquisition controlling device 1300. The image collecting device 1400 may output a message relating to a movement induction of the image collecting device 1400 on the basis of guide change information. For example, the image collecting device 1400 may output a message (for example, at least one of a direction indicator, audio data guiding a direction, and a haptic pattern relating to a direction) guiding a movement of a device. When the image collecting device 1400 moves in correspondence to a corresponding guide message, it may collect a sensor value.

According to various embodiments of the present disclosure, the image collecting device 1400 may output the change guide 1733 to the display 1450 on the basis of guide change information (for example, information relating to the change guide 1723). When a movement of a device occurs, the image collecting device 1400 may change at least one of the position, size, color, or direction of the change guide 1733 in correspondence to the movement occurrence. When the change guide 1733 is arranged identical to similar to the reference guide 1712, the image collecting device 1400 may output a notification message for that. When the change guide 1733 is arranged identical or similar to the reference guide 1712, the image collecting device 1400 may perform image capturing in correspondence to a user control of the image acquisition controlling device 1300 or the image collecting device 1400. The image collecting device 1400 may transmit the captured obtained image 1731 to the image acquisition controlling device 1300. In an embodiment, the image collecting device 1400 may output the obtained image 1731 to the display 1450.

According to various embodiments of the present disclosure, the image acquisition controlling device 1300 may check that a currently transmitted image is an obtained image captured from the image collecting device 1400 on the basis of metadata confirmation of an image received from the outside and may store the obtained image in a memory. Or, the image acquisition controlling device 1330 may receive and store a captured image stored in the image collecting device 1400 on the basis of file transmission. For example, the image acquisition controlling device 1300 may transmit a message (for example, a message including at least part of metadata relating to an obtained image or a message including metadata relating to an obtained image such as a time, a position, and a device name) requesting an obtained image from the image collecting device 1400 through a user input control or by default. The image acquisition controlling device 1300 may receive a obtained image corresponding to the metadata from the image collecting device 1400 according to a user control of the image collecting device 1400 or automatically. The image acquisition controlling device 1300 may store the received obtained image in a memory automatically or in correspondence to a user control. In the state 1740, the obtained image 1731 that the image collecting device 1400 obtains is received, the image acquisition controlling device 1300 may output the received obtained image 1741 to the display 1350. Here, the display 1350 of the image acquisition controlling device 1300 may be synchronized with the display 1450. Accordingly, the image acquisition controlling device 1300 may display the change guide 1723 where an arrangement state is adjusted according to an adjustment of the change guide 1733. When the change guide 1723 is adjusted and arranged identical or similar to the reference guide 1722, the image acquisition controlling device 1300 may output a notification message for an arrangement state. In this operation, the image acquisition controlling device 1300 may output an inducement message 1746 inducing image capturing at one side of a screen. For example, the inducement message 1746 may be a virtual capturing button (for example, a capturing button image displayed at one side of a display). When the image acquisition controlling device 1300 transmits an event corresponding to the selection of the inducement message 1746 to the image collecting device 1400, the image collecting device 1400 may perform image capturing automatically in correspondence to a control of the image acquisition controlling device 1300.

As mentioned above, even when the image acquisition controlling device 1300 and the image collecting device 1400 are spaced a specified distance from each other, a capturing composition of the image collecting device 1400 may be changed by the image acquisition controlling device 1300. In this operation, the image acquisition controlling device 1300 may allow a user to understand a capturing composition that the image collecting device 1400 has to capture more intuitively by changing a reference guide on a reference image.

As mentioned above, according to various embodiments of the present disclosure, an electronic device operating method (for example, an operating method of an image collecting device) may include an operation for receiving guide change information guiding a capturing composition change relating to a transmitted reference image and an operation for displaying a change guide corresponding to the guide change information.

According to various embodiments of the present disclosure, the method may further include an operation for outputting a message inducing an identical or similar arrangement or a designated arrangement of the designated reference guide and the change guide.

According to various embodiments of the present disclosure, the method may further include an operation for adjusting an arrangement state of the change guide on the basis of a sensor value collected in corresponding to the device movement.

According to various embodiments of the present disclosure, the method may further include an operation for outputting a message inducing image capturing when the change guide and a designated reference guide have an identical or similar arrangement or a designated arrangement.

According to various embodiments of the present disclosure, the method may further include an operation for controlling automatic image capturing when the change guide and a designated reference guide have an identical or similar arrangement or a designated arrangement.

According to various embodiments of the present disclosure, the method may further include an operation for transmitting the captured obtained image to a device providing the guide change information.

According to various embodiments of the present disclosure, the displaying operation may include an operation for displaying a matrix guide where the reference image is arranged in a specified area where a display area of a display is divided in correspondence to the guide change information.

According to various embodiments of the present disclosure, the method may further include an operation for outputting a guide message inducing a device movement to capture an image corresponding to selected areas from specified areas of the matrix guide.

According to various embodiments of the present disclosure, the method may further include an operation for controlling automatic image capturing when entering a capturing composition corresponding to the selected areas.

According to various embodiments of the present disclosure, the method may further include an operation for transmitting a group image captured in correspondence to the selected areas to a device providing the guide change information.

Figure 18:
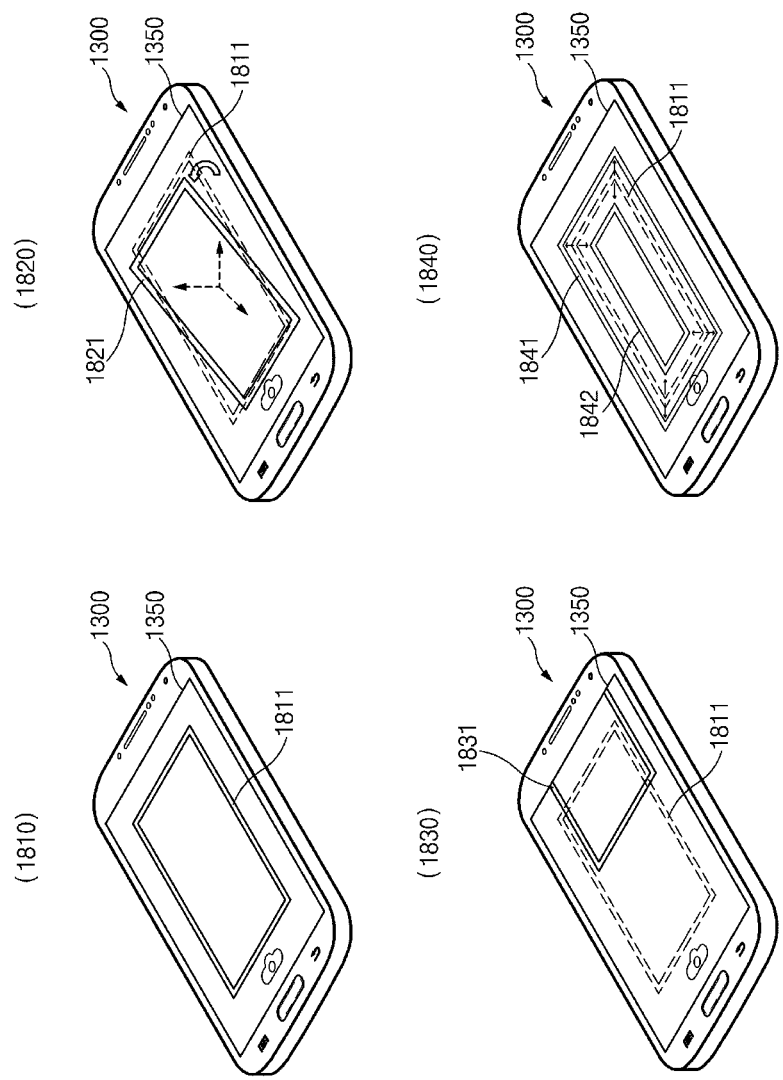
FIG. 18 is a view illustrating a screen view relating to guide change according to an embodiment of the present disclosure.

FIG. 18 is a view illustrating a screen view relating to guide change according to an embodiment of the present disclosure.

Referring to FIG. 18, according to various embodiments of the present disclosure, as shown in the state 1810, the display 1350 of the image acquisition controlling device 1300 may output a reference guide 1811. In relation to this, when a capturing composition controlling function is activated, the image acquisition controlling device 1300 may output the reference guide 1811 on the basis of the stored reference guide information. According to an embodiment of the present disclosure, when a reference image is received from the image collecting device 1400 (for example, the image collecting device 1401 or 1402), the image acquisition controlling device 1300 may output the reference guide 1811 while the reference image is outputted. The reference guide 1811, for example, may be an image (or a text) designating a specified position of the display 1350. For example, the reference guide 1811 may have a rectangular strip (or an elliptical band) as shown in the drawing.

According to various embodiments of the present disclosure, a change guide changed according to a touch event or a movement of a device may be outputted in the state 1820, a state 1830, and a state 1840. For example, when a directional touch event rotating (or changing the direction of) the reference guide 1811 occurs as shown in the state 1820, the direction changed change guide 1821 may be displayed on the basis of the reference guide 1811. The change guide displayed in the state 1820 may rotate to the left or the right of the reference guide 1811 on the basis of the front of the display 1350. Or, when a movement touch event moving the position of the reference guide 1811 occurs in the state 1830, the position changed change guide 1831 may be displayed on the basis of the reference guide 1811. Or, when a scaling touch event changing the size of the reference guide 1811 occurs in the state 1840, the size changed change guide 1841 or 1842 may be displayed on the basis of the reference guide 1811.

According to various embodiments of the present disclosure, the change guide may have a form in which at least one of the position, direction (or angle), size, or color of the reference guide 1811 is changed. For example, the change guide may have a form in which the size and size are changed on the basis of the reference guide 1811. Or, the change guide may have a form in which the direction and size are changed on the basis of the reference guide 1811. Or, the change guide may have a form in which the position, direction, and size are changed on the basis of the reference guide 1811.

In the above-mentioned description, the cases that change guides 1821, 1831, 1841, and 1842 are outputted in correspondence to a touch event changing the reference guide 1811 are described but present disclosure is not limited thereto. For example, additionally or alternatively, the touch event may be a sensor value corresponding to a movement change of the image acquisition controlling device 1300. According to an embodiment of the present disclosure, when the image acquisition controlling device 1300 rotates to a specified direction (for example, at least one of the left and right, up and down, and diagonal directions), the change guide 1821 may be displayed as shown in the state 1820. According to an embodiment of the present disclosure, when the image acquisition controlling device 1300 moves to a specified direction (for example, at least one of the left and right, up and down, and diagonal directions), the change guide 1831 may be displayed as shown in the state 1830. According to an embodiment of the present disclosure, when the image acquisition controlling device 1300 moves to a specified direction (for example, at least one of the back and forth directions), the change guide 1841 may be displayed as shown in the state 1840. For example, when a user grabs the image acquisition controlling device 1300 and moves it away from the user, the change guide 1841 enlarged than the reference guide 1811 may be displayed. Or, when a user grabs the image acquisition controlling device 1300 and moves it closer to the user, the change guide 1842 reduced than the reference guide 1811 may be displayed.

The image acquisition controlling device 1300 may transmit guide change information (or capturing composition information) including at least one of a touch event, a sensor value, an arrangement state value of a change guide, and an arrangement difference value between the reference guide 1811 and the change guide, to the image collecting device 1400.

When the guide change information is received from the image acquisition controlling device 1300, the image collecting device 1400 may output a second change guide corresponding to corresponding information. The second change guide may be adjusted in correspondence to a movement of the image collecting device 1400. For example, when the change guide is outputted to the display of the image collecting device 1400 as shown in the state 1830, in order to match the center point of the change guide and the center point of the display or arrange the change guide to be identical or similar to the second reference guide, a user may move the image collecting device 1400 in the upper direction. The image collecting device 1400 may collect a sensor value of a device moving in the upper direction and may adjust an arrangement state of the change guide on the basis of the sensor value. For another example, when the change guide is outputted to the display of the image collecting device 1400 as shown in the state 1840, a user may move the image collecting device 1400 to the front or the back. When the image collecting device 1400 moves to the front or the back, it may collect a sensor value corresponding to a corresponding movement and may adjust the size of the change guide on the basis of the sensor value. According to an embodiment of the present disclosure, the image collecting device 1400 may adjust the position or size of the change guide on the basis of a sensor and image processing in correspondence to a corresponding movement.

Figure 19A:
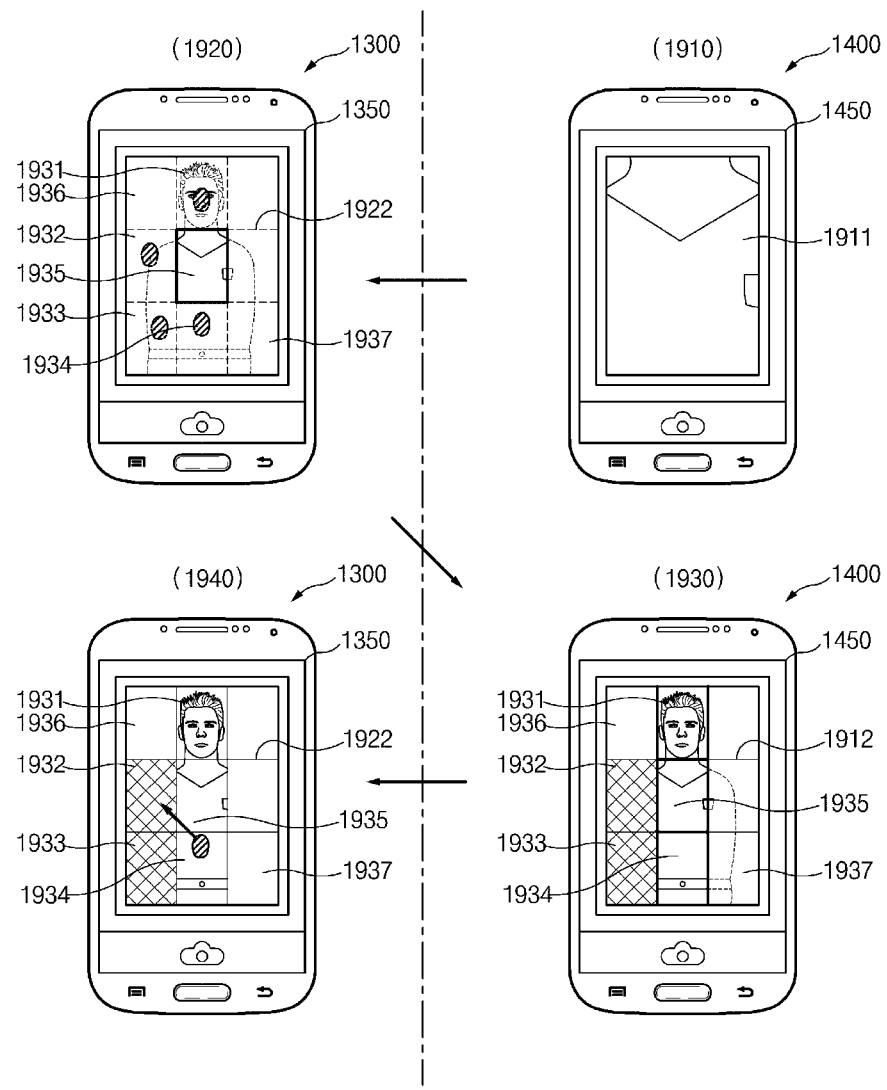
FIG. 19A is a view illustrating a screen view relating to matrix guide management according to an embodiment of the present disclosure.

FIG. 19A is a view illustrating another screen view relating to guide management according an embodiment of the present disclosure.

Referring to FIG. 19A, as shown in the state 1910, the image collecting device 1400 (for example, the image collecting device 1401 or 1402) may activate a camera module and may collect a reference image 1911 in relation to a capturing composition controlling function. The image collecting device 1400 may transmit the collected reference image 1911 to the image acquisition controlling device 1300. The reference image 1911 may be at least one of a preview image or a captured image as mentioned above. The collected reference image 1911 may be outputted to the display 1450. The image acquisition controlling device 1300 may output the received reference image 1911 to the display 1350.

The image acquisition controlling device 1300 may output the matrix guide 1922 in relation to the capturing composition controlling function as shown in the state 1920. In relation to this, the image acquisition controlling device 1300 may provide a menu item, an icon or a key button having an allocated function, which are used for outputting the matrix guide 1922. When an output of the matrix guide 1922 is requested, the image acquisition controlling device 1300 may display the matrix guide 1922 including a reference image area 1935 (for example, an area where an image generated based on the reference image 1911 that the image collecting device 1400 provides is disposed) to the display 1350. It is shown in the state 1920 that the reference image area 1935 is disposed at the center of the matrix guide 1922. According to various embodiments of the present disclosure, the reference image area 1935 may be disposed at a specified edge position of the matrix guide 1922. In an embodiment, the reference image area 1935 may move to a specified position of the matrix guide 1922 in correspondence to an input event. For example, a user may touch the reference image area 1935 thereby moving it to a specified position of the matrix guide 1922.

According to various embodiments of the present disclosure, a user may select specified points of the matrix guide 1922. For example, a user may select at least one area (for example, a selection area 1931, a selection area 1932, a selection area 1933, and a selection area 1934) from peripheral areas of the reference image area 1935. When at least one is selected from the peripheral areas, the image acquisition controlling device 1300 may collect position information of the selection areas 1931, 1932, 1933, and 1934. The image acquisition controlling device 1300 may transmit the matrix guide 1922 and the position information of the selection areas to the image collecting device 1400.

According to various embodiments of the present disclosure, the size of the matrix guide 1922 may be adjusted. For example, although the matrix guide 1922 is displayed with a 3×3 type in the drawing, the matrix guide 1922 may have various sizes such as 2×2, 4×4, 5×4, 6×6, 9×9, and 12×12 or may be outputted with a specific size (a call point of the matrix guide 1922) in correspondence to a user setting or an input event (for example, a pinch zoom-in or zoom-out event or a flick or tap event). When the size of the matrix guide 1922 is changed, at least one of the size or position of the reference image area 1935 may be changed. For example, when the matrix guide 1922 has a 2×2 type, the reference image area 1935 may be scaled to a relatively larger area compared to a 3×3 type. In an embodiment, it may be disposed in a specific area (for example, one of upper left, upper right, lower left or lower right) In an embodiment, when the matrix guide 1922 has a 9×9 type, the reference image area 1935 may be scaled to a relatively smaller area compared to a 3×3 type. In the 9×9 type matrix guide 1922, the reference image area 1935 may be disposed at the center or may be disposed at a designated specific position. In an embodiment, the position of the reference image area 1935 may be changed in the matrix guide 1922 in correspondence to an input event.

When receiving the matrix guide 1922 and position information of the selection areas from the image acquisition controlling device 1300, as shown in the state 1930, the image collecting device 1400 may output a matrix guide 1912 corresponding thereto to the display 1450. The matrix guide 1912 may have the same type as the matrix guide 1922. According to various embodiments of the present disclosure, the matrix guide 1912 may be outputted with a specified transparency. The image collecting device 1400 outputs the matrix guide 1912 wherein the second reference image area 1935 is disposed and may display the selection area 1931, 1932, 1933, and 1934 to be distinguished from unselected areas. According to various embodiments of the present disclosure, the image collecting device 1400 may output a guide message relating to a movement induction of the image acquisition controlling device 1300 to collect images of the selection areas 1931, 1932, 1933, and 1934. For example, the image collecting device 1400 may calculate the distance and direction that the image collecting device 1400 moves in order to obtain an image corresponding to a selection area on the basis of the size of the matrix guide 1912 or the position and size of the reference image area. The image collecting device 1400 may output a guide message to allow a camera module to have a capturing composition relating to selection area capturing on the basis of the calculated distance and direction information. According to an embodiment of the present disclosure, the image collecting device 1400 may output a change guide for capturing the selection area 1931. A user may perform a movement control (for example, at least one change control of the position, direction, and size of a capturing composition on the basis of a reference image area by moving the image collecting device 1400 in a specific direction by a specified distance) of the image collecting device 1400 to arrange the change guide to be identical or similar to the selection area 1931.

When a preview image at a position corresponding to the selection area 1931 is collected by the capturing composition of the camera module, the image collecting device 1400 may output a message inducing capturing. Or, the image collecting device 1400 may perform image capturing automatically. According to various embodiments of the present disclosure, when an image corresponding to the selection area 1931 is collected, the image collecting device 1400 may transmit the collected image to the image acquisition controlling device 1300. In an embodiment, the image collecting device 1400 may adjust the size of the collected image and may then output it to the selection area 1931. In a similar manner, the image collecting device 1400 may collect a captured image of the selection area 1034 and may then output the collected image to the selection area 1934. An image collected in correspondence to the selection area 1934 may be transmitted to the image acquisition controlling device 1300.

According to various embodiments of the present disclosure, when all images corresponding to the selection areas 1931, 1932, 1933, and 1934 are collected, the image collecting device 1400 may generate a group image and may then transmit it to the image acquisition controlling device 1300. Or, as described above, when an image corresponding to each selection area is collected, it may be transmitted to the image acquisition controlling device 1300 in real time.

When the captured image is received from the image collecting device 1400, the image acquisition controlling device 1300 may arrange corresponding images in the matrix guide 1922 as shown in the state 1940. For example, the image acquisition controlling device 1300 may arrange the received image in each of the selection area 1931 and the selection area 1934. When an image corresponding to the selection area 1932 and the selection area 1933 is received, the image acquisition controlling device 1300 may arrange the selection area 1931 and the selection area 1934 as follows.

According to various embodiments of the present disclosure, after designating a specific area among the selection areas 1931, 1932, 1933, and 1934 and the reference image area 1935 of the image acquisition controlling device 1300 as a new reference area, a user may initialize the matrix guide 1922. For example, after designating the selection area 1934 as a reference image area, a user may initialize the matrix guide 1922. In this case, as shown in the state 1920, a matrix guide where the selection area 1934 is arranged as a reference image area at a specified position may be outputted to the display 1350. A user may select new areas on the new matrix and may then transmit them to the image collecting device 1400.

According to various embodiments of the present disclosure, when a specific area (for example, the selection area 1931) is selected, the image acquisition controlling device 1300 may output the specific area in full screen in correspondence to a type of an input event. Or, the image acquisition controlling device 1300 may change into a specific matrix guide type including the selection area 1931 in correspondence to a type of the input event. According to an embodiment of the present disclosure, when a pinch-out touch event occurs on the selection area 1931, the image acquisition controlling device 1300 change a type of matrix guide from 9×9 to 4×4, 3×3, 2×2, or 1×1 or from 9×9 to 3×3, 9×9, or 12×12 in correspondence to a pinch distance (for example, a distance between touched two points). Correspondingly, an image displayed on a corresponding matrix guide may be enlarged or reduced.

At least one of the position, direction, and size of the above-mentioned matrix guide 1922 may be changed on the display 1350 in correspondence to a touch event. Also, as described with reference to FIG. 17, the matrix guide 1922 may be synchronized with the matrix guide 1912 of the image collecting device 1400. According to an embodiment of the present disclosure, when the matrix guide 1922 moves on the display 1350, the same or similar matrix guide may be redefined on the display 1350. For example, when a touch event for moving the selection area 1934 to the selection area 1932 occurs in the state 1920, the image acquisition controlling device 1300 moves the reference image area 1935 to an area 1936 and the selection area 1934 to an area 1932, and an area 1937 to the reference image area 1935. Also, the selection area 1933 and the selection area 1931 may not be disposed on the display 1350. As the selection area 1934 moves, new areas may be arranged on places where there was the selection area 1934. As the movement occurs, the image acquisition controlling device 1300 may transmit a matrix guide updated according to an input event or in correspondence to a movement occurrence, to the image collecting device 1400.

On the above-mentioned capturing composition controlling function, a user operating the image acquisition controlling device 1300 may request image acquisition for various portions of a specific subject through the image collecting device 1400. For example, on the basis of the above-mentioned function, a user may request various images for patient's affected areas or surrounding areas of an affected area. Here, a user of the image acquisition controlling device 1300 may select a type of the matrix guide 1922 and may then request a zoomed out areas for checking an enlarged affected area or a surrounding area of an affected area.

Figure 19B:
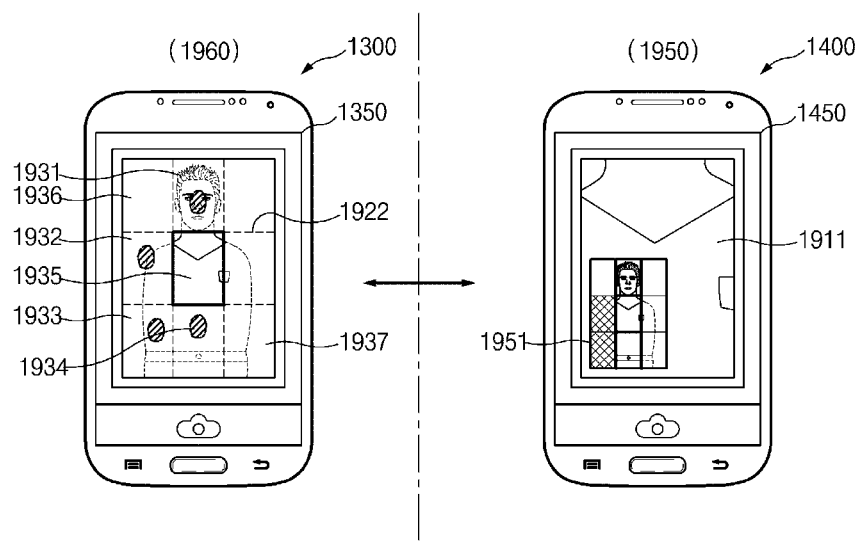
FIG. 19B is a view illustrating a screen view relating to matrix mini guide management according to an embodiment of the present disclosure.

FIG. 19B is a view illustrating another screen view relating to guide management according to an embodiment of the present disclosure.

Referring to FIG. 19B, as shown in the state 1950, the image collecting device 1400 (for example, the image collecting device 1401 or 1402) may activate a camera module and may collect a reference image 1911 in relation to a capturing composition controlling function. The image collecting device 1400 may transmit the collected reference image 1911 to the image acquisition controlling device 1300. The reference image 1911 may be at least one of a preview image or a captured image as mentioned above.

The image acquisition controlling device 1300 may output the matrix guide 1922 in relation to the capturing composition controlling function as shown in the state 1960. In relation to this, the image acquisition controlling device 1300 may provide a menu item, an icon or a key button having an allocated function, which are used for outputting the matrix guide 1922. When an output of the matrix guide 1922 is requested, the image acquisition controlling device 1300 may display the matrix guide 1922 including a reference image area 1935 (for example, an area where an image generated based on the reference image 1911 that the image collecting device 1400 provides is disposed) to the display 1350.

According to various embodiments of the present, a user may select specified points of the matrix guide 1922. For example, a user may select at least one area (for example, a selection area 1931, a selection area 1932, a selection area 1933, and a selection area 1934) from peripheral areas of the reference image area 1935. When at least one is selected from the peripheral areas, the image acquisition controlling device 1300 may collect position information of the selection areas 1931, 1932, 1933, and 1934. The image acquisition controlling device 1300 may transmit the matrix guide 1922 and the position information of the selection areas to the image collecting device 1400.

When receiving the matrix guide 1922 and position information of the selection areas from the image acquisition controlling device 1300, as shown in the state 1950, the image collecting device 1400 may output a matrix mini guide 1951 corresponding thereto to the display 1450. The matrix mini guide 1951 may have the same type as the matrix guide 1922 but may have an adjusted size. A user operating the image collecting device 1400 may check areas not captured currently among areas requested from the matrix guide 1922 through the matrix mini guide 1951. Accordingly, a user may change the capturing structure of the image collecting device 1400 by checking the matrix mini guide 1951. An image captured after the capturing composition change may be transmitted to the image acquisition controlling device 1300. Or, the captured image may be applied to the matrix mini guide 1951.

According to various embodiments of the present disclosure, after transmitting the captured image to the image acquisition controlling device 1300, the image collecting device 1400 may receive information (for example, image where a captured image that the image collecting device 1400 transmits is disposed in a specified area of the matrix guide 1922) that updates the matrix guide 1922 from the image acquisition controlling device 1300. According to various embodiments of the present disclosure, after the image acquisition controlling device 1300 generates and updates the matrix mini guide 1951, the matrix mini guide 1951 may be transmitted to the image collecting device 1400 or the image acquisition controlling device 1300 may generate the matrix mini guide 1951 on the basis of the received matrix guide 1922 and captured images. According to various embodiments of the present disclosure, the position and size of the matrix mini guide 1941 may be changed in correspondence to a user input of the image collecting device 1400. According to various embodiments of the present disclosure, the matrix mini guide 1951 may have a specified transparency. For example, the matrix mini guide 1951 may be outputted to the display 1450 with a semi transparency and may be overlaid on a subject image. A user may adjust the capturing structure relating to subject capturing while checking the matrix mini guide 1951 with a semi-transparency.

According to various embodiments of the present disclosure, when an image relating to a specific position designated in the matrix guide 1922 is included in a capturing composition, the matrix mini guide 1951 may provide a notification relating to capturing induction through a designated method (for example, screen blinking, virtual capturing button output, or blinking of the matrix mini guide 1951). The image relating to the position designated in the matrix guide 1922 may be estimated through the extraction of the boundary area portion and continuous boundary lines (the boundary line of an object) of a reference image. Or, as described above, an image included in the capturing composition may be estimated based on a sensor value generated according to a movement of the image collecting device 1300 and image processing in a form corresponding to a capturing composition that the image acquisition controlling device 1300 request.

Figure 20:
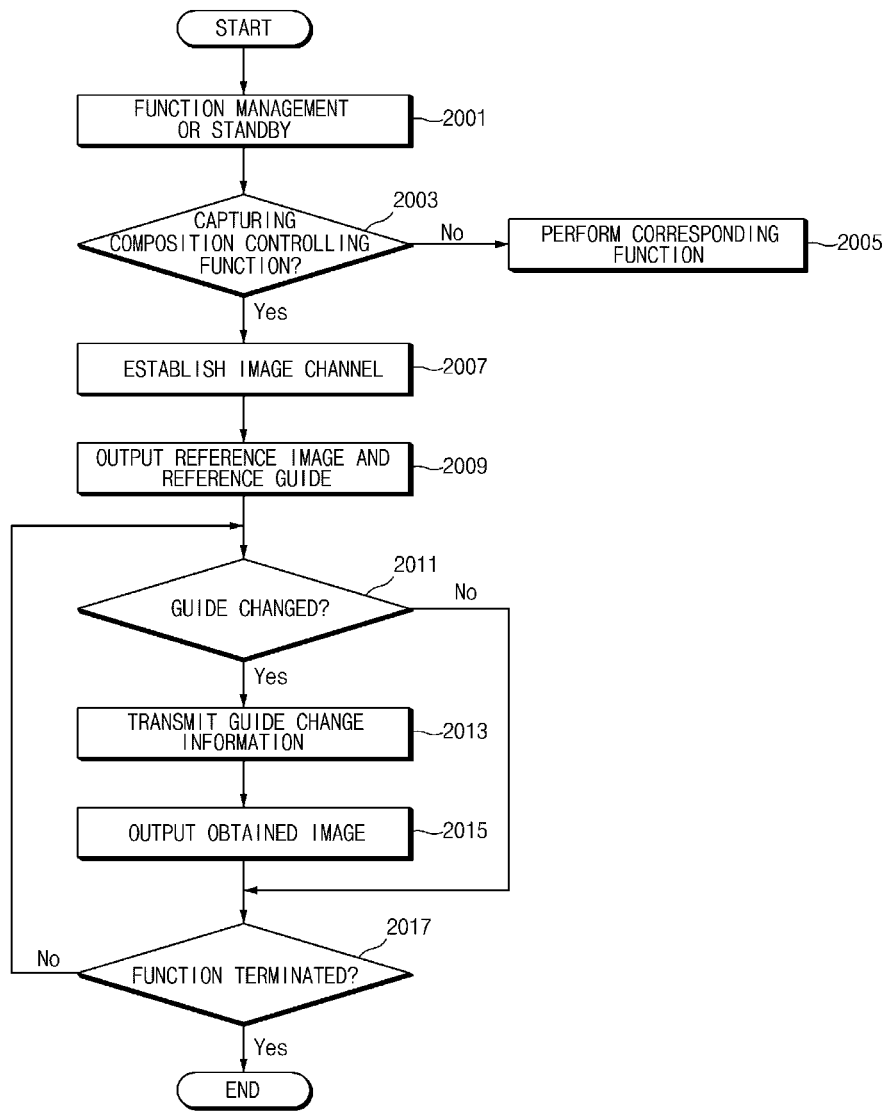
FIG. 20 is a view illustrating a method of operating an image acquisition controlling device according to an embodiment of the present disclosure.

FIG. 20 is a view illustrating a method of operating an image acquisition controlling device according to an embodiment of the present disclosure.

Referring to FIG. 20, according to various embodiments of the present disclosure, in relation to the method of operating the image acquisition controlling device, the image acquisition controlling device 1300 may perform a function operation or a function standby in operation 2001. The function operation or the function standby may be in a state in which power supply is maintained in the image acquisition controlling device 1300 or a designated function (for example, a standby screen output function) is provided in correspondence to set schedule information.

In operation 2003, the image acquisition controlling device 1300 may check whether there is an event occurrence or setting relating to capturing composition controlling function activation. For example, the image acquisition controlling device 1300 may check whether there is a communication connection request relating to capturing composition control from the image collecting device 1400 (for example, the image collecting device 1401 or 1402). Or, the image acquisition controlling device 1300 may check whether there is an input event relating to a capturing composition controlling function. If there is no corresponding event or setting, the image acquisition controlling device 1300 may perform a specific function (for example, a previous function operation or a function standby state or a designated function) in operation 2005.

If there is an event of setting relating to capturing composition controlling function activation, the image acquisition controlling device 1300 may establish an image channel (or a data communication channel) with the image collecting device 1400 in operation 2007. In correspondence to the image channel establishment, the image acquisition controlling device 1300 may receive a reference image from the image collecting device 1400 and may then output it to the display in operation 2009. In this operation, the image acquisition controlling device 1300 may output a reference guide on the reference image.

In operation 2011, the image acquisition controlling device 1300 may check whether an event relating to guide change occurs. For example, the image acquisition controlling device 1300 may check whether a sensor value relating to a touch event or a device movement occurs. If there is an event relating to guide change, the image acquisition controlling device 1300 may generate guide change information on the basis of an event relating to guide change and may then transmit it to the image collecting device 1400 in operation 2013. In operation 2015, the image acquisition controlling device 1300 may output an obtained image (for example, a preview image or an captured image obtained from the image collecting device 1400 on the basis of guide change information) received from the image collecting device 1400. In operation 2011, if no guide change related event occurs for a specified time, the image acquisition controlling device 1300 may skip operation 2013 to operation 2015 and may then proceed to operation 2017.

In operation 2017, the image acquisition controlling device 1300 may check whether an event relating to the termination of a function (for example, a capturing composition controlling function) occurs. When there is no an event relating to the termination of a function, the image acquisition controlling device 1300 may proceed to operation 2011 to check whether there is a guide change and perform processing according thereto again.

Figure 21:
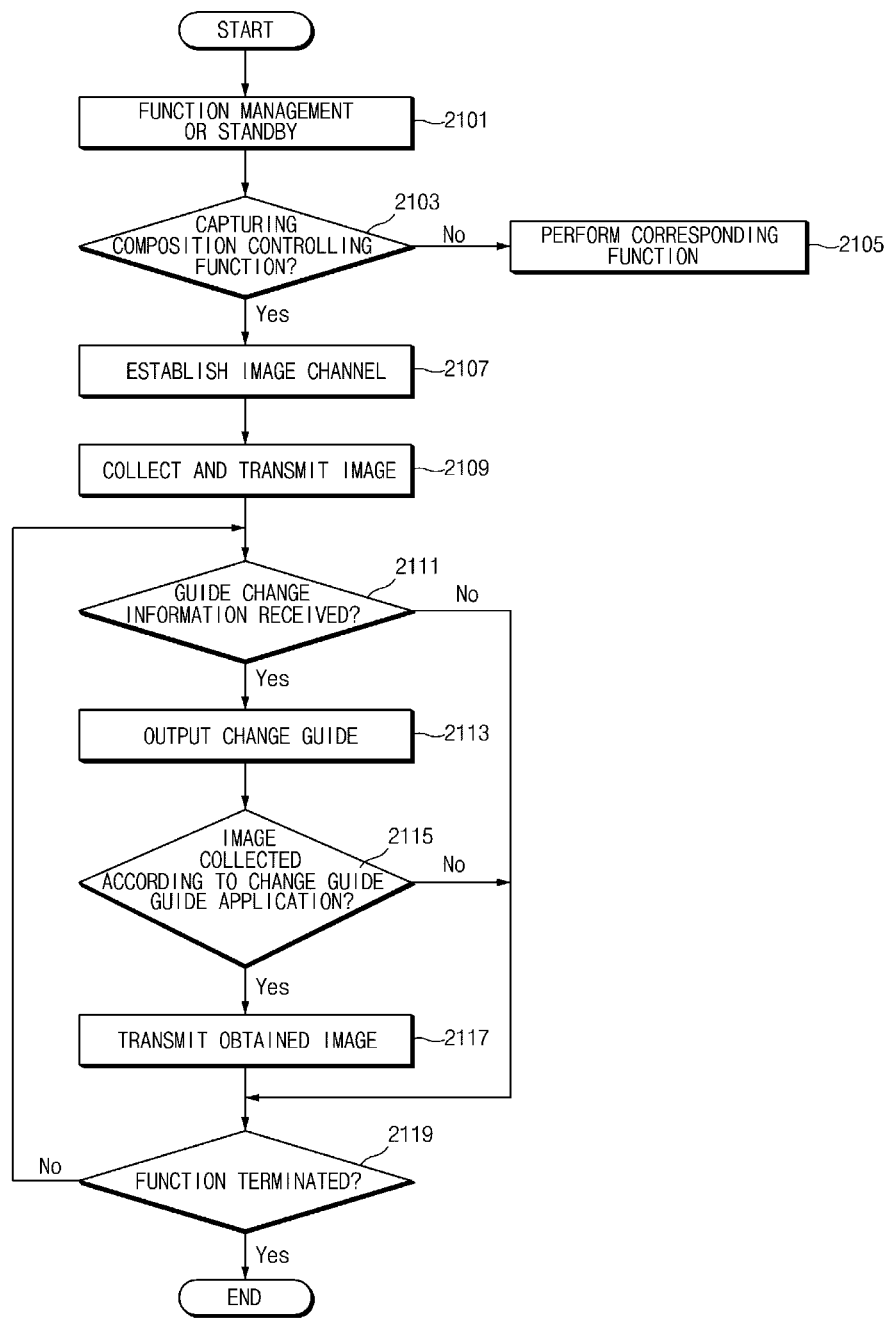
FIG. 21 is a view illustrating a method of operating an image collecting device according to an embodiment of the present disclosure.

FIG. 21 is a view illustrating a method of operating an image collecting device according to an embodiment of the present disclosure.

Referring to FIG. 21, according to various embodiments of the present disclosure, in relation to the method of operating the image collecting device, the image collecting device 1400 may perform a function operation or standby in operation 2101. In relation to the function operation or standby, the image collecting device 1400 may perform a set function or output a standby screen, or perform a function according to an input event.

In operation 2103, the image collecting device 1400 may check whether an event relating to a capturing composition controlling function occurs. For example, whether an event relating to capturing composition control occurs or whether a communication channel establishment request relating to capturing composition control from the image acquisition controlling device 1300 may be checked. If no event occurs, the image collecting device 1400 may perform a specific function (for example, a function operation or a function performed during standby or a function designated according to a user input) in operation 2105.

If there is an event, the image collecting device 1400 may establish an image channel (or a data communication channel) with the image acquisition controlling device 1300 in operation 2107. If the image channel is established, the image collecting device 1400 may perform collection and transmission in operation 2109. According to various embodiments of the present disclosure, when an event relating to a capturing composition controlling function occurs, the image collecting device 1400 may collect an image first and may then establish a communication channel with the image acquisition controlling device 1300. In operation 2109, the image collecting device 1400 may transmit a reference image including at least one of a preview image or an image captured according to a user input to the image acquisition control device 1300.

In operation 2111, the image collecting device 1400 may check whether guide change information is received. When the guide change information is received, the image collecting device 1400 may output a change guide corresponding to the received guide change information in operation 2113. During a change guide output, the image collecting device 1400 may output a guide message (for example, information inducing a change of an arrangement state of the image collecting device 1400) guiding a device movement control relating to a capturing composition change. If no guide change information is received, the image collecting device 1400 may skip operations 2113, 2115, and 2117.

In operation 2115, the image collecting device 1400 may check whether guide change information is received. For example, the image collecting device 1400 may not capture an image when a change guide and a reference guide (for example, a reference guide displayed on the display of the image collecting device 1400) are not arranged identically or similarly. Or, the image collecting device 1400 may output a message notifying that an arrangement state from guide change information is not satisfied. If image collection according to the change guide application is not performed, the image collecting device 1400 may skip operation 2117.

In operation 2117, the image collecting device 1400 may transmit an image obtained according to the change guide application to the image acquisition control device 1300. According to various embodiments of the present disclosure, when a change guide is adjusted in correspondence to an arrangement state change of a device, the image collecting device 1400 may transmit the adjusted value (or a change guide where an arrangement state is adjusted on a display) of the change guide to the image acquisition controlling device 1300.

In operation 2119, the image collecting device 1400 may check whether there is an event relating to capturing composition controlling function termination. If there is no function termination related event, the image collecting device 1400 may proceed to operation 2111 and may then perform the subsequent operations again.

Figure 22:
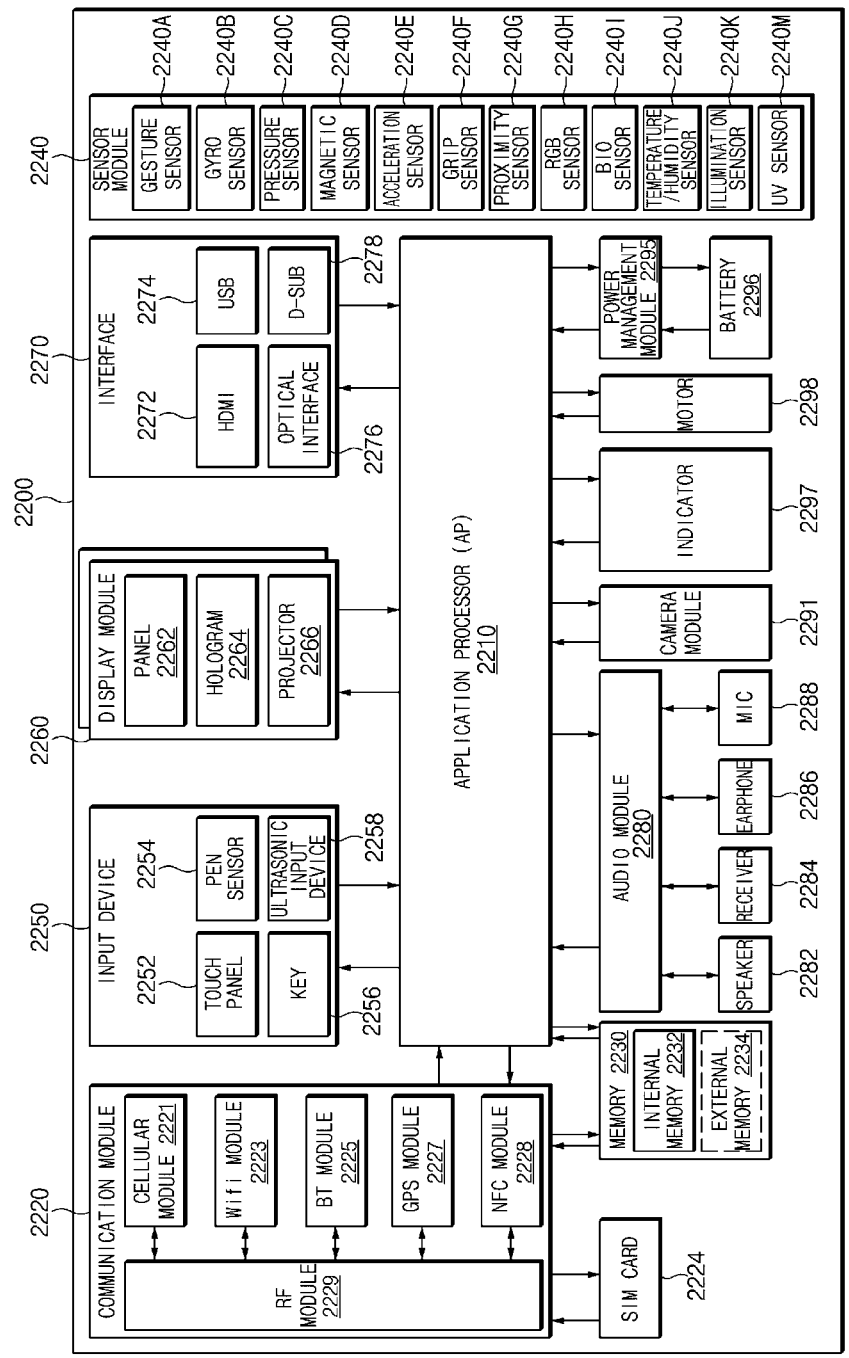
FIG. 22 is a block diagram illustrating an electronic device according to an embodiment of the present disclosure.

FIG. 22 is a block diagram illustrating an electronic device according to an embodiment of the present disclosure.

FIG. 22 is a block diagram illustrating an electronic device 2200 according to an embodiment of the present disclosure.

The electronic device 2200, for example, may configure all or part of the above-mentioned electronic devices 101, 103, 1300, and 1400. Referring to FIG. 22, the electronic device 2200 includes at least one Application Processor (AP) 2210, a communication module 2220, a Subscriber Identification Module (SIM) card 2224, a memory 2230, a sensor module 2240, an input device 2250, a display 2260, an interface 2270, an audio module 2280, a camera module 2291, a power management module 2295, a battery 2296, an indicator 2297, and a motor 2298.

The AP 2210 may control a plurality of hardware or software components connected to the AP 2210 and also may perform various data processing and operations with multimedia data by executing an operating system or an application program. The AP 2210 may be implemented with a System on Chip (SoC), for example. According to an embodiment of the present disclosure, the AP 2210 may further include a Graphic Processing Unit (GPU) (not shown).

The communication module 2220 (for example, the communication interface 1360) may perform data transmission through a communication between other electronic devices (for example, the electronic device 1401 and 1402 or the server 1403) connected to the electronic device 2200 (for example, the electronic devices 101, 103, 1300, and 1400) via a network. According to an embodiment of the present disclosure, the communication module 2220 may include a cellular module 2221, a Wifi module 2223, a BT module 2225, a GPS module 2227, an NFC module 2228, and a Radio Frequency (RF) module 2229.

The cellular module 2221 may provide voice calls, video calls, text services, or internet services through a communication network (for example, LTE, LTE-A, CDMA, WCDMA, UMTS, WiBro, or GSM). In an embodiment, the cellular module 2221 may distinguish and authenticate an electronic device in a communication network by using a subscriber identification module (for example, the SIM card 2224), for example. According to an embodiment of the present disclosure, the cellular module 2221 may perform at least part of a function that the AP 2210 provides. For example, the cellular module 2221 may perform at least part of a multimedia control function.

According to an embodiment of the present disclosure, the cellular module 2221 may further include a Communication Processor (CP). In an embodiment, the cellular module 2221 may be implemented with SoC, for example. As shown in FIG. 22, components such as the cellular module 2221 (for example, a CP), the memory 2230, or the power management module 2295 are separated from the AP 2210, but according to an embodiment of the present disclosure, the AP 2210 may be implemented including some of the above-mentioned components (for example, the cellular module 2221).

According to an embodiment of the present disclosure, the AP 2210 or the cellular module 2221 (for example, a CP) may load instructions or data, which are received from a nonvolatile memory or at least one of other components connected thereto, into a volatile memory and then may process them. Furthermore, the AP 2210 or the cellular module 2221 may store data received from or generated by at least one of other components in a nonvolatile memory.

Each of the Wifi module 2223, the BT module 2225, the GPS module 2227, and the NFC module 2228 may include a processor for processing data transmitted/received through a corresponding module. Although the cellular module 2221, the Wifi module 2223, the BT module 2225, the GPS module 2227, and the NFC module 2228 are shown as separate blocks in FIG. 22, according to an embodiment of the present disclosure, some (for example, at least two) of the cellular module 2221, the Wifi module 2223, the BT module 2225, the GPS module 2227, and the NFC module 2228 may be included in one Integrated Chip (IC) or an IC package. For example, at least some (for example, a CP corresponding to the cellular module 2221 and a Wifi processor corresponding to the Wifi module 2223) of the cellular module 2221, the Wifi module 2223, the BT module 2225, the GPS module 2227, and the NFC module 2228 may be implemented with one SoC.

The RF module 2229 (for example, the first RF unit 213 and the second RF unit 313) may be responsible for data transmission, for example, the transmission of an RF signal. Although not shown in the drawings, the RF module 2229 may include a transceiver, a Power Amp Module (PAM), a frequency filter, or a Low Noise Amplifier (LNA). In an embodiment, the RF module 2229 may further include components for transmitting/receiving electromagnetic waves on a free space in a wireless communication, for example, conductors or conducting wires. Although the cellular module 2221, the Wifi module 2223, the BT module 2225, the GPS module 2227, and the NFC module 2228 share one RF module 2229 shown in FIG. 22, according to an embodiment of the present disclosure, at least one of the cellular module 2221, the Wifi module 2223, the BT module 2225, the GPS module 2227, and the NFC module 2228 may perform the transmission of an RF signal through an additional RF module.

The SIM card 2224 may be a card including a subscriber identification module and may be inserted into a slot formed at a specific position of an electronic device. The SIM card 2224 may include unique identification information (for example, an Integrated Circuit Card Identifier (ICCID)) or subscriber information (for example, an International Mobile Subscriber Identity (IMSI)).

The memory 2230 (for example, the storage module 1330, the first memory unit 209, and the second memory unit 309) may include an internal memory 2232 or an external memory 2234. The internal memory 2232 may include at least one of a volatile memory (for example, Dynamic RAM (DRAM), Static RAM (SRAM), Synchronous Dynamic RAM (SDRAM)) and a non-volatile memory (for example, One Time Programmable ROM (OTPROM), Programmable ROM (PROM), Erasable and Programmable ROM (EPROM), Electrically Erasable and Programmable ROM (EEPROM), mask ROM, flash ROM, NAND flash memory, and NOR flash memory)

According to an embodiment of the present disclosure, the internal memory 2232 may be a Solid State Drive (SSD). The external memory 2234 may further include flash drive, for example, Compact Flash (CF), Secure Digital (SD), Micro Secure Digital (Micro-SD), Mini Secure Digital (Mini-SD), Extreme Digital (xD), or memory stick. The external memory 2234 may be functionally connected to the electronic device 2200 through various interfaces. According to an embodiment of the present disclosure, the electronic device 2200 may further include a storage device (or a storage medium) such as a hard drive.

According to various embodiments, the memory 2230 may store at least one of a reference image that an image acquisition controlling device receives, a change guide changing a reference image, a received obtained image, and a matrix guide. Or, the memory 2230 may store at least one of a reference image that an image collecting device collects, an obtained image, and a group image acquired in relation to a matrix guide.

The sensor module 2240 (for example, the first motion detection unit 211, the second motion detection unit 311, the first sensor module 1390, and the second sensor module) measures physical quantities or detects an operating state of the electronic device 2200, thereby converting the measured or detected information into electrical signals. The sensor module 2240 may include at least one of a gesture sensor 2240A, a gyro sensor 2240B, a pressure sensor 2240C, a magnetic sensor 2240D, an acceleration sensor 2240E, a grip sensor 2240F, a proximity sensor 2240G, a color sensor 2240H (for example, a Red, Green, Blue (RGB) sensor), a bio sensor 2240I, a temperature/humidity sensor 2240J, an illumination sensor 2240K, and an Ultra Violet (UV) sensor 2240M. Additionally/alternately, the sensor module 2240 may include an E-nose sensor (not shown), an Electromyography (EMG) sensor, an Electroencephalogram (EEG) sensor (not shown), an Electrocardiogram (ECG) sensor (not shown), an Infra Red (IR) sensor (not shown), an iris sensor (not shown), or a fingerprint sensor (not shown). The sensor module 2240 may further include a control circuit for controlling at least one sensor therein.

The input device 2250 (for example, the first input unit 207, the second input unit 307, and the input/output interface 1340) may include a touch panel 2252, a (digital) pen sensor 2254, a key 2256, or an ultrasonic input device 2258. The touch panel 2252 may recognize a touch input through at least one of capacitive, resistive, infrared, or ultrasonic methods, for example. In an embodiment, the touch panel 2252 may further include a control circuit. In the case of the capacitive method, both direct touch and proximity recognition are possible. The touch panel 2252 may further include a tactile layer. In this case, the touch panel 2252 may provide a tactile response to a user.

The (digital) pen sensor 2254 may be implemented through a method similar or identical to that of receiving a user's touch input or an additional sheet for recognition. The key 2256 may include a physical button, a touch key, an optical key, or a keypad, for example. The ultrasonic input device 2258, as a device checking data by detecting sound waves through a mic (for example, the mic 2288) in the electronic device 2200, may provide wireless recognition through an input tool generating ultrasonic signals. According to an embodiment of the present disclosure, the electronic device 2200 may receive a user input from an external device (for example, a computer or a server) connected to the electronic device 200 through the communication module 2220.

The display 2260 (for example, the display 1350, the display 1450, the first display unit 205, and the second display unit 305) may include a panel 2262, a hologram device 2264, or a projector 2266. The panel 2262 may include a Liquid-Crystal Display (LCD) or an Active-Matrix Organic Light-Emitting Diode (AM-OLED). The panel 2262 may be implemented to be flexible, transparent, or wearable, for example. The panel 2262 and the touch panel 2252 may be configured with one module. The hologram device 2264 may show three-dimensional images in the air by using the interference of light. The projector 2266 may display an image by projecting light on a screen. The screen, for example, may be placed inside or outside the electronic device 2200. According to an embodiment of the present disclosure, the display 2260 may further include a control circuit for controlling the panel 2262, the hologram device 2264, or the projector 2266.

According to various embodiments, the display 2260 in the image acquisition controlling device may output at least one of a received reference image, a first reference guide, and a first change guide. In an embodiment, the display 2260 in the image acquisition controlling device may display a matrix guide and an obtained image or a group image disposed in each area. The display 2260 in the image collecting device may output at least one of a collected reference image, a second reference guide, and a second change guide. In an embodiment, the display 2260 in the image collecting device may output a matrix guide that is identical to a matrix guide disposed on the image acquisition controlling device. The display 2260 of the image collecting device may arrange an image that a camera module captures at specified points of a matrix guide.

The interface 2270 may include a HDMI 2272, a USB 2274, an optical interface 2276, or a D-SUBminiature (D-SUB) 2278, for example. The interface 2270 may be included in the communication interface 1360 shown in FIG. 13, for example. Additionally/alternately, the interface 2270 may include a Mobile High-definition Link (MHL) interface, a Secure Digital (SD) card/Multi-Media Card (MMC) interface, or an Infrared Data Association (IrDA) standard interface.

The audio module 2280 may convert sound and electrical signals in both directions. At least some components of the audio module 2280 may be included in the input/output interface 1340 shown in FIG. 13, for example. The audio module 2280 may process sound information inputted/outputted through a speaker 2282, a receiver 2284, an earphone 2286, or a mic 2288.

According to various embodiments, the audio module 2280 may output at least one audio data relating to an image acquisition controlling device management or an image collection device management. For example, the audio module 2280 in the image collecting device may output at least one of audio data relating to reference image collection, audio data guiding reference image transmission, audio data relating to a second reference guide output, audio data relating to a second change guide output, audio data guiding a movement inducement of an image collecting device in order for second change guide adjustment, audio data guiding whether a second reference guide and a second change guide are arranged identically or similarly, audio data guiding image automatic acquisition, and audio data guiding transmission of an obtained image. The audio module 2280 in the image acquisition controlling device may output audio data guiding a capturing composition control function, audio data guiding the reception of a reference image or the reception of an obtained image, and audio data guiding whether a second reference guide and a second change guide or a first reference guide and a first change guide are arranged identically or similarly.

The camera module 2291 (for example, the first camera unit 203, the second camera unit 303, the first camera module 1380, and the second camera module), as a device for capturing a still image and a video, may include at least one image sensor (for example, a front sensor or a rear sensor), a lens (not shown), an Image Signal Processor (ISP) (not shown), or a flash LED (not shown) (for example, an LED or a xenon lamp).

The power management module 2295 may manage the power of the electronic device 2200. Although not shown in the drawings, the power management module 2295 may include a Power Management Integrated Circuit (PMIC), a charger Integrated Circuit (IC), or a battery or fuel gauge, for example.

The PMIC may be built in an IC or SoC semiconductor, for example. A charging method may be classified as a wired method and a wireless method. The charger IC may charge a battery and may prevent overvoltage or overcurrent flow from a charger. According to an embodiment of the present disclosure, the charger IC may include a charger IC for at least one of a wired charging method and a wireless charging method. As the wireless charging method, for example, there is a magnetic resonance method, a magnetic induction method, or an electromagnetic method. An additional circuit for wireless charging, for example, a circuit such as a coil loop, a resonant circuit, or a rectifier circuit, may be added.

The battery gauge may measure the remaining amount of the battery 2296, or a voltage, current, or temperature of the battery 396 during charging. The battery 2296 may store or generate electricity and may supply power to the electronic device 2200 by using the stored or generated electricity. The battery 2296, for example, may include a rechargeable battery or a solar battery.

The indicator 2297 may display a specific state of the electronic device 2200 or part thereof (for example, the AP 2210), for example, a booting state, a message state, or a charging state. The motor 2298 may convert electrical signals into mechanical vibration. Although not shown in the drawings, the electronic device 2200 may include a processing device (for example, a GPU) for mobile TV support. A processing device for mobile TV support may process media data according to the standards such as Digital Multimedia Broadcasting (DMB), Digital Video Broadcasting (DVB), or media flow.

According to various embodiments, in relation to a capturing composition controlling function between an image acquisition controlling device and an image collecting device, an output a reference guide may be omitted in at least one of the image acquisition controlling device or the image collecting device. For example, the image acquisition controlling device outputs only a reference image and may output only a first change guide on a display in correspondence to a touch event or a sensor value. In an embodiment, the image acquisition controlling device may transmit arrangement state information of a first change guide as guide change information to the image collecting device. The image collecting device may display a second change guide corresponding to the arrangement state of the first change guide. According to various embodiments, the first change guide or the second change guide may include at least one (information relating to at least one of position adjustment, direction adjustment, and size adjustment) of a text, an image, audio data, or a haptic pattern of a device.

Each of the above-mentioned components of the electronic device according to various embodiments of the present disclosure may be configured with at least one component and the name of a corresponding component may vary according to the kind of an electronic device. Hardware according to an embodiment of the present disclosure may be configured including at least one of the above-mentioned components or additional other components. In an embodiment, some of components in hardware according to an embodiment of the present disclosure are configured as one entity, so that functions of previous corresponding components are performed identically.

The term "module" used in this disclosure, for example, may mean a unit including a combination of at least one of hardware, software, and firmware. The term "module" and the term "unit", "logic", "logical block", "component", or "circuit" may be interchangeably used. A "module" may be a minimum unit or part of an integrally configured component. "module" may be a minimum unit performing at least one function or part thereof "module" may be implemented mechanically or electronically. For example, "module" according to various embodiments of the present disclosure may include at least one of an Application-Specific Integrated Circuit (ASIC) chip performing certain operations, Field-Programmable Gate Arrays (FPGAs), or a programmable-logic device, all of which are known or to be developed in the future.

According to various embodiments, at least part of a device (for example, modules or functions thereof) or a method (for example, operations) according to this disclosure, for example, as in a form of a programming module, may be implemented using an instruction stored in computer-readable storage media. When at least one processor (for example, the processor) executes an instruction, it may perform a function corresponding to the instruction. The computer-readable storage media may include a memory, for example. At least part of a programming module may be implemented (for example, executed) by a processor, for example. At least part of a programming module may include a module, a program, a routine, sets of instructions, or a process to perform at least one function, for example.

According to various embodiments, the instruction may include an instruction performing an operation for receiving guide change information guiding a capturing composition change relating to a transmitted reference image and an operation for displaying a change guide corresponding to the guide change information and also may support image acquisition controlling device management. According to various embodiments, the instruction may include an operation for receiving a reference image and an operation for displaying a change guide corresponding to a capturing composition change relating to the reference image in correspondence to event occurrence and also may support image collecting device management.

The computer-readable storage media may include Magnetic Media such as a hard disk, a floppy disk, and a magnetic tape, Optical Media such as Compact Disc Read Only Memory (CD-ROM) and Digital Versatile Disc (DVD), Magneto-Optical Media such as Floptical Disk, and a hardware device especially configured to store and perform a program instruction (for example, a programming module) such as Read Only Memory (ROM), Random Access Memory (RAM), and flash memory. In an embodiment, a program instruction may include high-level language code executable by a computer using an interpreter in addition to machine code created by a complier. The hardware device may be configured to operate as at least one software module to perform an operation according to various embodiments of the present disclosure and vice versa.

A module of a programming module according to various embodiments of the present disclosure may include at least one of the above-mentioned components or additional other components. Or, some programming modules may be omitted. Operations performed by a module, a programming module, or other components according to various embodiments of the present disclosure may be executed through a sequential, parallel, repetitive or heuristic method. In an embodiment, some operations may be executed in a different order or may be omitted. Or, other operations may be added.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A portable terminal comprising:
   a communication interface configured to establish a communication channel with another portable terminal; and
   a processor configured to functionally connect to the communication interface,
   wherein the processor is configured to:
      receive a reference image from the other portable terminal through the communication channel,
      display a reference guide of the portable terminal designated in relation to the reference image,
      display a change guide of the portable terminal corresponding to a capturing composition change relating to an event occurrence of the portable terminal, and
      transmit guide change information associated with the change guide to the other portable terminal, and
   wherein the guide change information is used to induce movement of the other portable terminal, until an arrangement between the change guide of the portable terminal and the reference guide of the portable terminal has changed from a non-overlapping state to a substantially overlapping state, for the capturing composition change.

2. The portable terminal according to claim 1, wherein the processor is configured to control to display the change guide of the portable terminal where an arrangement between the change guide of the portable terminal and the reference guide of the portable terminal is changed in correspondence to the event occurrence of the portable terminal.

3. The portable terminal according to claim 1, wherein the processor is configured to control to display the change guide of the portable terminal where at least one of a position, direction, size, or color of the reference guide of the portable terminal is adjusted in correspondence to a touch event.

4. The portable terminal according to claim 1, wherein the processor is configured to control to display the change guide of the portable terminal where an arrangement between the change guide of the portable terminal and the reference guide of the portable terminal is adjusted in correspondence to a sensor value relating to movement of the portable terminal.

5. The portable terminal according to claim 1, wherein the guide change information comprises at least one of arrangement information of the change guide of the portable terminal or a difference value between the reference guide of the portable terminal and the change guide of the portable terminal.

6. A portable terminal comprising:
   a camera module configured to collect a reference image;
   a communication interface configured to establish a communication channel with another portable terminal; and
   a processor configured to functionally connect to the camera module and the communication interface,
   wherein the processor is configured to:
      transmit the reference image to the other portable terminal through the communication channel,
      display a reference guide of the portable terminal designated in relation to the reference image,
      receive guide change information, guiding a capturing composition change relating to the reference image, from the other portable terminal, and
      display a change guide of the portable terminal corresponding to the guide change information,
   wherein movement of the portable terminal is induced, until an arrangement between the change guide of the portable terminal and the reference guide of the portable terminal has changed from a non-overlapping state to a substantially overlapping state, for the capturing composition change.

7. The portable terminal according to claim 6, wherein the processor is configured to control to change the arrangement between the change guide of the portable terminal and the reference guide of the portable terminal on the basis of a sensor value collected in correspondence to the movement of the portable terminal.

8. The portable terminal according to claim 6, wherein the processor is configured to control to output a message inducing image capturing when the arrangement between the change guide of the portable terminal and the reference guide of the portable terminal is in a designated state or capture an image automatically when the arrangement between the change guide of the portable terminal and the reference guide of the portable terminal is in the designated state.

9. The portable terminal according to claim 8, wherein the processor is configured to control to transmit the captured image to the other portable terminal.

* * * * *